United States Patent [19]
Bradish et al.

[11] Patent Number: 5,830,064
[45] Date of Patent: Nov. 3, 1998

[54] APPARATUS AND METHOD FOR DISTINGUISHING EVENTS WHICH COLLECTIVELY EXCEED CHANCE EXPECTATIONS AND THEREBY CONTROLLING AN OUTPUT

[75] Inventors: G. Johnston Bradish, Bernardsville; York H. Dobyns, Princeton; Brenda J. Dunne, Princeton; Robert G. Jahn, Princeton; Roger D. Nelson, Princeton, all of N.J.; John E. Haaland, St. Paul; Steven M. Hamer, Mahtomedi, both of Minn.

[73] Assignee: Pear, Inc., St. Paul, Minn.

[21] Appl. No.: 683,878

[22] Filed: Jul. 19, 1996

Related U.S. Application Data

[60] Provisional application No. 60/020,279, Jun. 21, 1996.
[51] Int. Cl.⁶ ................................. A63F 9/24; G06F 7/00
[52] U.S. Cl. ........................................ 463/22; 364/717.01
[58] Field of Search .................... 364/717.01, 717.02, 364/717.03, 717.04, 717.05, 717.06, 717.07; 455/4.1, 4.2; 348/7; 463/22

[56] References Cited

PUBLICATIONS

Radin, Dean I et al., "Evidence for Consiousness–Related Anomalies in Random Physical Systems," Reprinted from *Foundations of Physics, vol. 19, No. 12,* pp. 1499–1514 (1989).

Y. H. Dobyns, "On the Bayesian Analysis of REG Data", *Journal of Scientific Exploration,* vol. 6, No. 1, 23–45, (1992).

B. J. Dunne, "Co–Operator Experiments with an REG Device", *Pear Technical Report 91005,* Princeton Engineering Anomalies Research, 3 cover pages and 1–22, (Dec. 1991).

B. J. Dunne, et al., "Consciousness and Anamolous Physical Phenomena", *Pear Technical Report 95004,* Princeton Engineering Anomalies Research, 3 cover pages and 2–24 and 9 drawing sheets, (May 1995).

B. J. Dunne, et al., "Experiments in Remote Human/Machine Interaction", *Journal of Scientific Exploratio,* vol. 6, No. 4, 311–322, (1992).

B. J. Dunne, "Gender Differences in Human/Machine Anomalies", *Technical Report 95005,* Princeton Engineering Anomalies Research, 3 cover pages and 2–91 and 16 drawing sheets, (Aug. 1995).

B. J. Dunne, et al., "Series Position Effects in Random Event Generator Experiments", *Journal of Scientific Exploration,* vol. 8, No. 2, 197–215, (1994).

R. G. Jahn, "Anomalies: Analysis and Aesthetics", *J. Scientific Exploration,* vol. 3, No. 1, Pergamon Press, 15–26, (1989).

R. G. Jahn, et al., "Count Population Profiles in Engineering Anomalies Experiments", *Journal of Scientific Exploration,* vol. 5, No. 2, Pergamon Press, 205–232, (1991).

(List continued on next page.)

*Primary Examiner*—George Manuel
*Attorney, Agent, or Firm*—Schwegman, Lundberg, Woessner & Kluth, P.A.

[57] ABSTRACT

A method and apparatus of generating values and detecting whether the values fall outside chance probabilities. In one embodiment, a random-noise source provides a signal that is amplified, conditioned, and sampled to provide a series of random numbers. In one embodiment, conditioning includes inverting some of the values according to a pseudo-random sequence mask in order to remove certain first-order bias. Another aspect of this invention is to perform a statistical analysis of the values generated, and to control an output based in whether or not a chance expectation has been exceeded, or by the probability of a certain result obtained. Yet another aspect is to control a toy, game, appliance, or computer display based on whether or not a chance expectation has been exceeded by a measured sequence of values.

43 Claims, 24 Drawing Sheets

PUBLICATIONS

R. G. Jahn et al., "Engineering Anomalies Research", *J. Scientific Exploration,* vol. 1, No. 1, Pergamon Journals, 21–50, (1987).

R. G. Jahn, et al., "Margins of Reality", *Harcourt Brace & Company, First Harvest Edition,* (1987).

R. G. Jahn, et al., "On the Quantum Mechanics of Consciousness, with Applications to Anomalous Phenomena", *Foundations of Physics,* vol. 16, No. 8, Plenum Publishing, 721–772, (Aug. 1986).

R. G. Jahn, "Physical Aspects of Psychic Phenomena", *Physics Bulletin, 39,* 235–237, (1988).

R. G. Jahn, "The Complementarity of Consciousness", *Pear Technical Report 91006,* Princeton Engineering Anomalies Research, 3 cover pages and 1–13, (Dec. 1991).

R. G. Jahn, "The Persistent Paradox of Psychic Phenomena: An Engineering Perspective", *Proceedings of the IEEE,* vol. 70, No. 2, 136–170 (1982).

R. D. Nelson, et al., "Analysis of Variance of REG Experiments: Operator Intention, Secondary Parameters, Database Structure", *Pear Technical Report 91004,* Princeton Engineering Anomalies Research, 6 cover pages and 1–103, (Dec. 1991).

R. D. Nelson, et al., "FieldREG Anomalies in Group Situations", *Journal of Scientific Exploration, vol. 10, No. 1,* 111–141, (1996).

R. D. Nelson, et al., "Random Event Generator Qualification, Calibration, and Analysis", *Pear Technical Report 89001,* Princeton Engineering Anomalies Research, 6 cover pages, 1–19, 18 drawing sheets and 7 programming sheets, (Apr. 1989).

TABLE OF PSEUDO-RANDOM MASK VALUE
IN HEXADECIMAL BYTES, 0-69

| BYTE # | VALUE | BYTE # | VALUE | BYTE # | VALUE | BYTE # | VALUE |
|---|---|---|---|---|---|---|---|
| 0 | CA | 20 | 95 | 40 | B8 | 60 | A3 |
| 1 | 27 | 21 | 3A | 41 | A5 | 61 | 35 |
| 2 | D2 | 22 | 59 | 42 | 96 | 62 | E4 |
| 3 | 65 | 23 | 5A | 43 | A9 | 63 | 6C |
| 4 | 4B | 24 | 4E | 44 | 2E | 64 | 47 |
| 5 | C9 | 25 | 39 | 45 | 2D | 65 | 1B |
| 6 | 66 | 26 | D4 | 46 | C3 | 66 | 1D |
| 7 | 9A | 27 | 87 | 47 | 3C | 67 | B4 |
| 8 | 36 | 28 | 2B | 48 | D8 | 68 | 74 |
| 9 | F0 | 29 | E1 | 49 | 8E | 69 | 17 |
| 10 | E2 | 30 | D1 | 50 | 9C | | |
| 11 | C5 | 31 | 0F | 51 | 5C | | |
| 12 | 71 | 32 | 1E | 52 | 8D | | |
| 13 | 69 | 33 | B2 | 53 | C6 | | |
| 14 | 56 | 34 | 93 | 54 | 33 | | |
| 15 | AC | 35 | 8B | 55 | AA | | |
| 16 | E8 | 36 | 53 | 56 | 6A | | |
| 17 | B1 | 37 | 4D | 57 | 99 | | |
| 18 | CC | 38 | 63 | 58 | 78 | | |
| 19 | A6 | 39 | 55 | 59 | 72 | | |

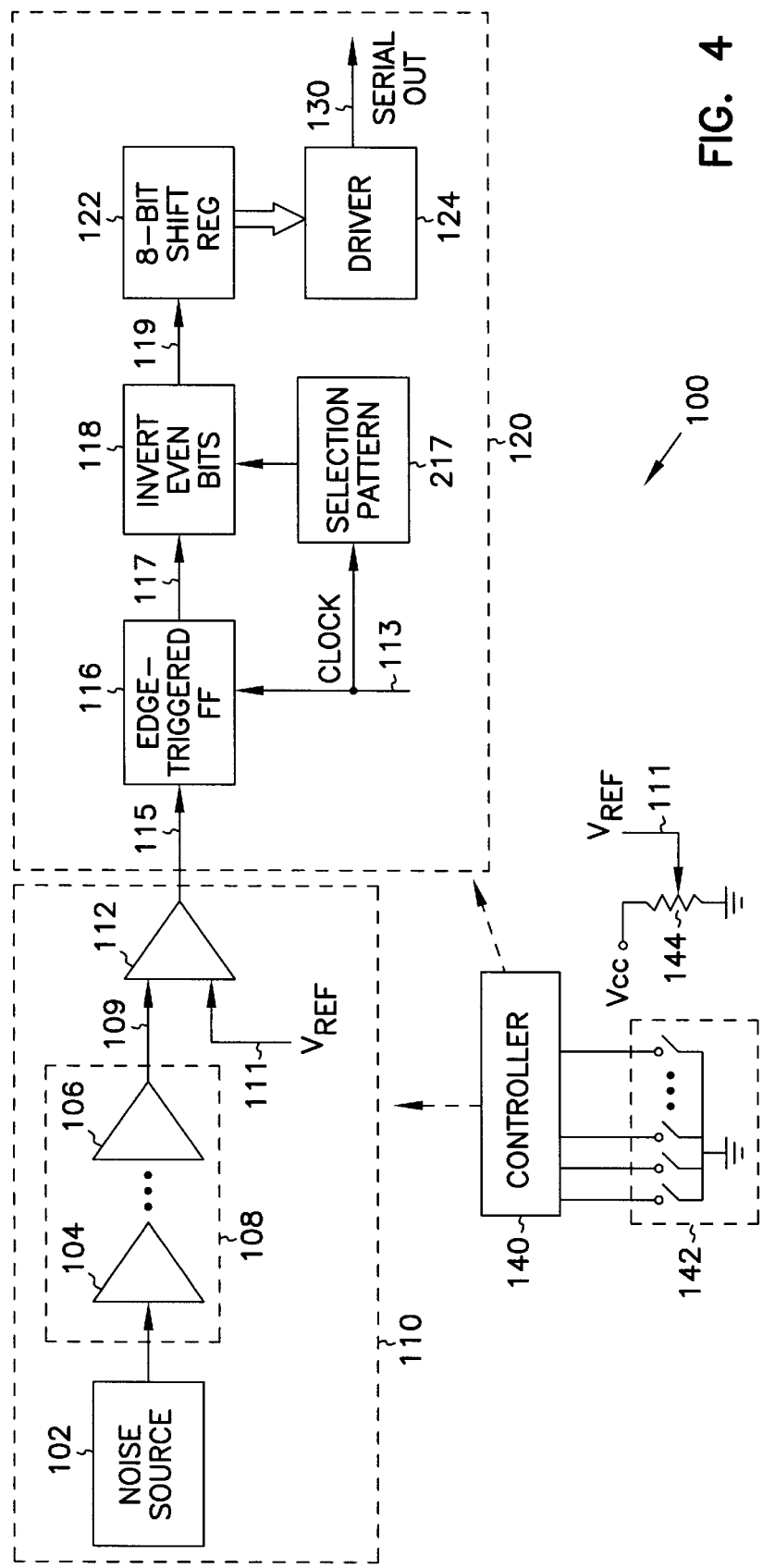

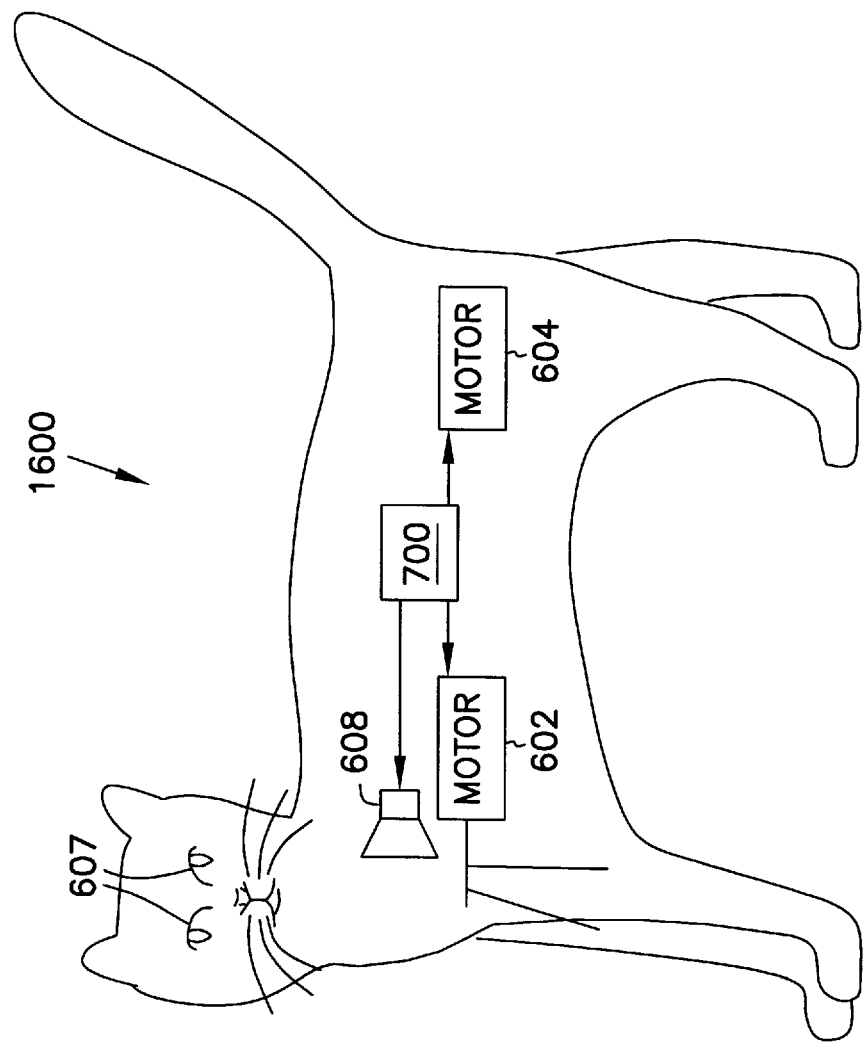

APPARATUS AND METHOD FOR DISTINGUISHING EVENTS WHICH COLLECTIVELY EXCEED CHANCE EXPECTATIONS AND THEREBY CONTROLLING AN OUTPUT

Benefit is hereby claimed under 35 U.S.C. § 119(e) of United States provisional patent application Ser. No. 60/020, 279, filed Jun. 21, 1996 entitled "FIELD RANDOM EVENT GENERATOR AND APPARATUS AND METHOD FOR DISTINGUISHING EVENTS WHICH COLLECTIVELY EXCEED CHANCE EXPECTATIONS AND THEREBY CONTROLLING AN OUTPUT".

1. Field of the Invention

This invention relates to the field of electronic detectors and controllers, and more specifically to a method and apparatus of generating values and detecting whether the values fall outside chance probabilities.

2. Background of the Invention

Many types of experiments and devices utilize random-event generators or random-number generators. Such generators include true-random-number generators (that generate truly random numbers) and pseudo-random-number generators (those devices and computer programs that generate pseudo-random numbers, which are seemingly random numbers, but which in actuality are more or less deterministic). Pseudo-random number generators can include devices or programs that generate a complex sequence of numbers that are based on a "seed," and that, given one particular seed, will generate the same sequence of pseudo-random numbers. Between true- and pseudo-random-number generators are "biased-true-random-number generators," that generate a biased sequence of random numbers, wherein the bias is due to perhaps some environmental factor, such as electrical or magnetic fields, temperature, voltage, circuit drift, or some other factor or field.

In attempts to produce true-random-number generators, researchers have attempted to remove or minimize causes of bias in the random number sequences generated. Unbiased random numbers are useful in a number of experimental and applied sciences. In the past, such attempts have resulted in expensive and highly sophisticated electronic circuits, which have been large, non-portable, complex, and difficult to interface.

A number of years of experiments at the PEAR Lab using a highly sophisticated microelectronic random event generator have demonstrated correlation of certain mean shifts of the output function with the stated intentions of operators physically isolated from the apparatus, compounding to a high level of statistical significance. Although the mechanism by which probabilities are affected is still not understood, the phenomenon has been well documented and results published in respected and refereed scientific journals, as well as the book *Margins of Reality, The Role of Consciousness in the Physical World*, by Robert G. Jahn and Brenda J. Dunne, Harcourt Brace and Company, 1987. The invention to be described is concerned with the reduction to practice of the laboratory instrument, yielding practical devices which may be mass produced economically and operated in the field. Additionally, it defines various implementations of the technology and the applications to which they may be put.

Much effort has been devoted over history by inventors, scientists and even gamblers and sports figures to effect some degree of control over autonomous physical objects and systems above and beyond the use of muscular contraction and extension. For example, some golfers "ooch" their putts towards the cup even after the ball leaves the club face. Slot machine players look to winning strategies. The Air Force has invested millions in research to produce systems which enable fighter pilots to operate their cockpit displays and guns without removing their hands from the flight controls. Clearly a form of control over one's environment which emanates from the mind alone, unfettered by the need for physical contact, is something long sought, and has provided the theme for numerous science-fiction scenarios. It offers a challenge to the scientific mind, and has long been a subject of fascination to the public in general.

Game devices, such as self-powered toy vehicles or computer video games, often have user-input control devices, such as joystick controllers, keyboards, trackballs, or "mice" which translate manual movements of a human operator (e.g., hand or finger movements) into control signals for moving or controlling operation of the toy or game. Each of these user-input control devices requires some muscular movement by the user. Thus, a device that responded to human intention from a human without any direct connection, and could "read" the thoughts or intentions of the human in order to control some device, has been dreamt of, but never realized.

SUMMARY OF THE INVENTION

The present invention provides a field random-event generator (F-REG) that generates sequences of "random" numbers or events, and that is small, portable, "calibrateable," and usable in the field. In one embodiment, the F-REG is designed to be miniaturized and inexpensive. The present invention also provides a method and apparatus for detecting engineering anomalies, or improbable sequences in the numbers generated by the random-event generator, that is usable in the field. The present invention also provides a method and apparatus for detecting signal or number excursions which exceed certain probabilities, and for activating switches and/or control signals based upon detection of such events.

Another aspect of the present invention is a "chance expectation detector": a method and apparatus for detecting signal or number excursions which exceed certain probabilities. In some embodiments, means for activating switches and/or control signals based upon detection of such events are provided in the chance expectation detector. One embodiment uses a small and inexpensive random source based upon the electronic noise produced in a resistor, diode, or some such similar effect, to generate a series of binary values (bits). A further embodiment selectively inverts some of the bits to reduce first-order bias effects. One such embodiment selectively inverts bits according to a pseudo-random series of values. A result series, having a predetermined number of these binary values, is accumulated to generate a sample result. The mean expected value and standard deviation for this number are calculated or predetermined empirically by calibration, and, in one embodiment, the number is compared to these expectations. In one embodiment, for example, 1024 bits are counted to generate an output number having an expected mean of 512 and standard deviation of 16. A further embodiment then subtracts 512 from such a count to generate an output number having an expected mean of zero and standard deviation of 16. One implementation uses an internal microprocessor to encode an asynchronous computer-interface signal to transmit the output number and/or statistical information regarding the output number; another utilizes a Universal Asynchronous Receiver Transmitter (UART) chip to perform this function.

Another embodiment of the present invention provides a system including a physical random-value source, electronic circuitry to amplify and shape the signal, a stored-program computer to provide statistical analysis, software or firmware to apply the detected and analyzed signal to the performance of some task and one or more output devices that provide feedback to an operator, player or control system. Analysis is accomplished by comparing statistically computed values derived from the random-value source to preset statistical threshold values corresponding to the probabilities of those computed values occurring by chance. Statistical parameters compared include, but are not limited to, the mean of the distribution, the time derivative of the distribution, and/or the time integral of the distribution. The system may include a game (such as a video game), a mechanical toy, or means for controlling other devices, such as means for adjusting of set points for heating and air conditioning or the intensity level of room lighting, where precision of operation and response time are not critical.

In one embodiment, the present invention provides an interface connectable to a serial port of a microcomputer, and is provided with software for experiments and calibrations, compiled for IBM PC/AT or similar clone equipment.

One application of the present invention is the investigation of anomalous interaction between an operator and random physical systems, whether by serious scientists or curious members of the public who would like to conduct experiments on their own.

Where games are involved, it is the presence of some less-than-total degree of control, rather than a deterministic sure thing, that makes a game interesting. If a high level of predictability were desirable, footballs would be round and baseball bats flat. A design where naturally occurring random factors are combined with a measure of control makes a game fresh and engaging for hours. Such a mix of factors is afforded by the nature of this invention, making it well suited to the application.

For the purposes of games, it is often the appearance of control, rather than actual control itself, that makes a game fun. In addition, games (such as video games) and toys should be somewhat challenging, dynamic, and moving, in order to keep the player's attention. In one embodiment, an F-REG generates a signal that is then coupled to a toy or game and is used to control the movement, operation, and/or function of the toy or game. In one embodiment, a user is encouraged to try to use his or her subjective intention to affect the control provided to the toy or game by the F-REG.

BRIEF DESCRIPTION OF THE DRAWINGS

FIG. 3 is a table of a seventy-byte pseudo-random sequence 299 having low autocorrelation useful for selectively inverting bits in a F-REG 100 or CED 700.

FIG. 4 is a block diagram of the electronics of one embodiment of a field-random-event generator 100.

FIG. 16 is a block diagram of a toy cat controlled by chance-expectation-detector 700.

DESCRIPTION OF PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Figure 1:
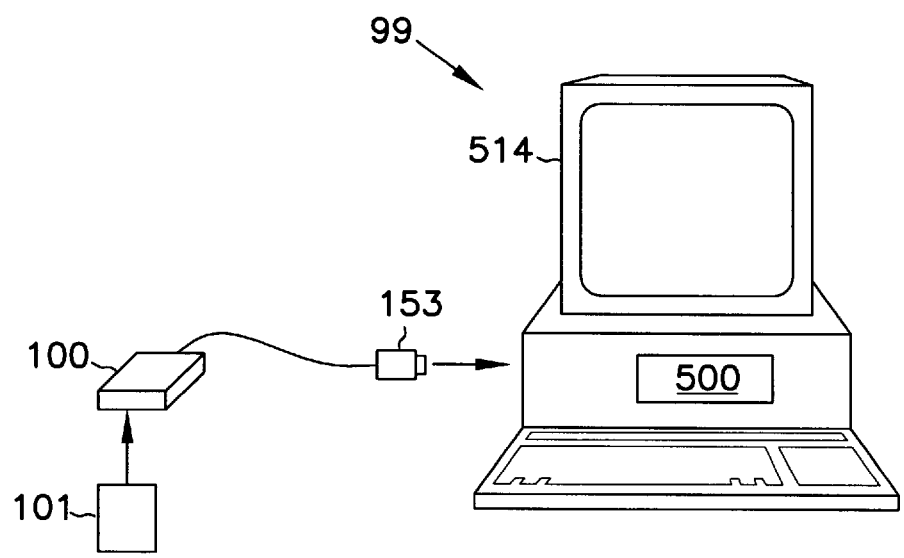
FIG. 1 is a diagram showing field-random-event generator (F-REG) 100 and computer 99.

FIG. 1 is a diagram showing field-random-event generator (F-REG) 100 and computer 99. In one embodiment, field-random-event generator 100 is a portable stand-alone unit contained in a 5×7×2 inch aluminum box. In this embodiment, a printed circuit board and precision components are used to achieve a highly standardized device with reliable performance. In one embodiment, a separate 12-volt DC supply 101 is connected to F-REG 100. In another embodiment, F-REG 100 is powered by an internal battery. In yet another embodiment, F-REG 100 is powered from computer 99. In the embodiment shown, F-REG 100 is connected to computer 99 by wire through DB9 connector 153. In another embodiment, an infra-red or other wireless transmitter and receiver is used to couple signals from F-REG 100 to computer 99.

Figure 2:
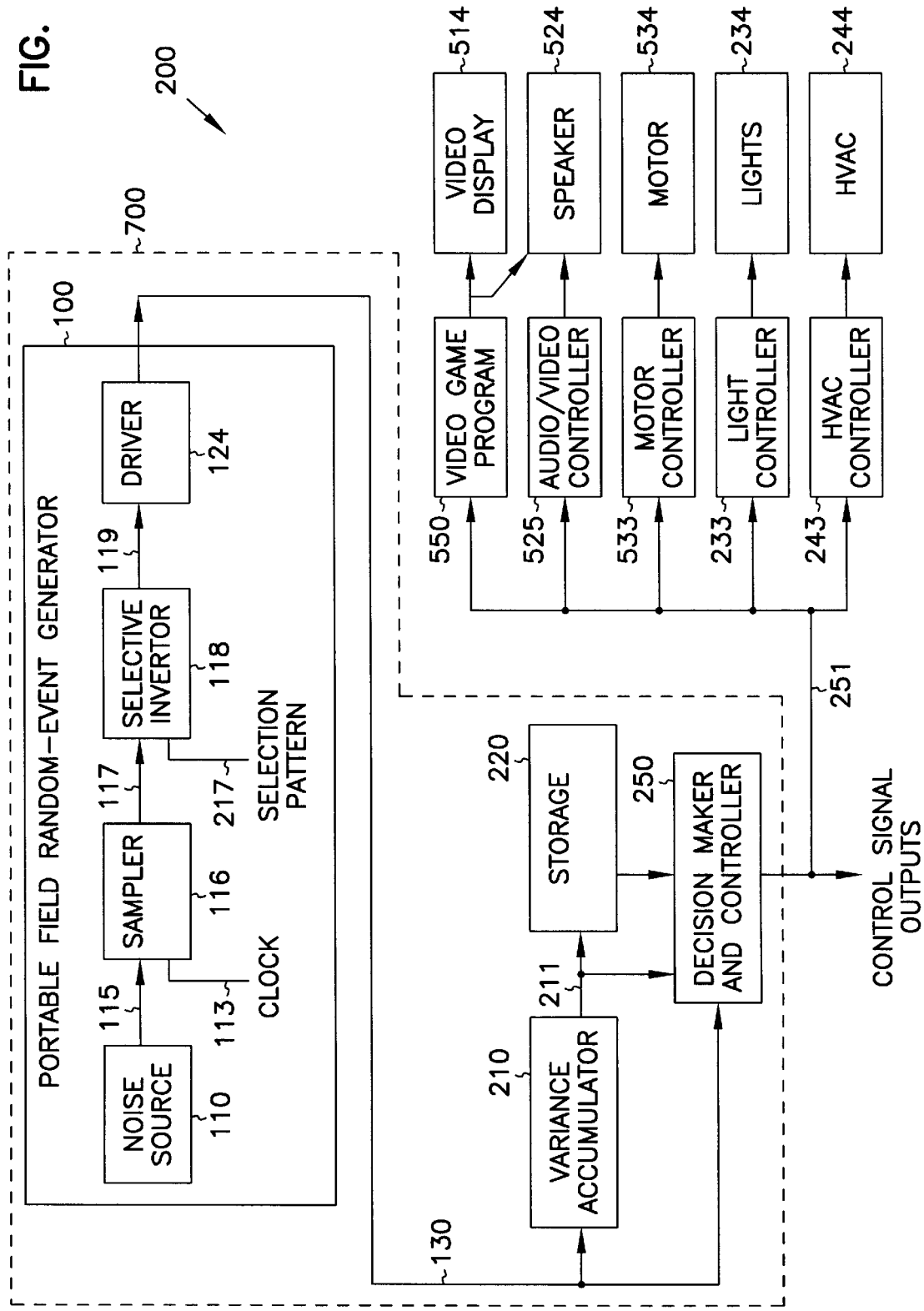
FIG. 2 is a block diagram of one embodiment of a chance-expectation-detector (CED) system 200 including a CED 700.

FIG. 2 is a block diagram of one embodiment of a chance-expectation-detector ("CED") system 200 including a chance-expectation-detector 700 and various optional result controllers. A source of a series values having a stochastic or random component, which in the embodiment shown is a portable field random event generator ("F-REG") 100, is provided. In the embodiment shown, the series of values is a serial sequence of random binary values ("bits"). In other embodiments, the series of bits are gathered into bytes or data words by driver 124 (i.e., converted from a series of 1-bit words to a series of, e.g., 8-bit bytes) for parallel transmission to other components of CED system 200. In the embodiment shown, F-REG 100 includes a noise source 110 that provides a conditioned, amplified analog noise signal 115 that is representative of some physical process having a stochastic or random component, such as noise from a resistor. Noise source 110 may also contain a bias caused by one or more external fields, temperatures, or other sources of bias such as human volitional or emotional state. In the embodiment shown, analog noise signal 115 is coupled to sampler 116 that generates a series of digital data values 117 representative analog noise signal 115 at a sequence of time points, e.g., once every millisecond or once every microsecond as determined by clock 113. In one such embodiment, sampler 116 is a one-bit analog-to-digital convertor ("ADC") that generates a series of random bits as determined by analog signal 115. In another such embodiment, sampler 116 is an N-bit analog-to-digital convertor ("ADC") that generates a series of random N-bit values as determined by analog signal 115. In one embodiment, the series of digital data values 117 is then coupled through selective invertor 118 that selectively inverts some of the series of digital data values 117 (as selected by selection pattern 217) to generate a selectively inverted series of digital data values 119. In one embodiment, selective invertor 118 includes a one-bit exclusive-OR circuit fed by a signal on selection pattern 217 having one-half the frequency of clock 113, thus inverting every other bit of the series of digital data values 117. In another embodiment, selective invertor 118 includes an exclusive-OR circuit fed by a series of pseudo-random bits, thus inverting bits of the series of digital data values 117 in a pseudo-random manner. In one such embodiment, the series of pseudo-random bits is derived by selecting seventy different one-byte data values (each having 8-bits) that each have four ones and four zeros (in binary notation); these seventy bytes are then placed into 70-byte strings and each string is tested for overall autocorrelation (the proportion of bits that have the corresponding bits the same in successive bytes as determined by a sum-of-squares of lag-1 autocorrelation coefficients between corresponding bits in adjacent bytes). In one such embodiment, approximately 100,000 different reordered 70-byte sequences are tested, and the one sequence having the lowest autocorrelation value is selected. This selected 70-byte pseudo-random sequence mask 299 (as shown in FIG. 3, which shows the sequence of byte numbers 0–69, and the corresponding hexadecimal byte values) has each byte having four ones and four zeros, and each byte different than the other 69 bytes, and, in one embodiment, is stored in a table in the storage of a microcomputer and successively fed as selection pattern 217. In one such embodiment, successive groups of eight bits each of the series of digital data values 117 are gathered and this "raw" data byte is exclusive-ORed with a successive byte of the 70-byte pseudo-random sequence mask 299, thus inverting four bits of each group to produce the selectively inverted series of digital data values 119, which are then transmitted by driver 124 as signal 130. Since each successive byte of raw data is exclusive-ORed with a byte of the selected 70-byte pseudo-random sequence mask 299, no mean DC bias is introduced.

In one embodiment, driver 124 is a UART or RS232 driver coupled to a wire. In another embodiment, driver 124 is an infra-red transmitter that transmits an infra-red beam encoding the selectively inverted series of digital data values 119 in much the way that commands are transmitted by a television remote-control device. Other embodiments use other coupling means. Signal 130 is coupled to variance accumulator 210 and/or decision maker and controller 250.

Variance accumulator 210 performs one or more statistical analyses on the selectively inverted series of digital data values 119 transmitted in signal 130. In one embodiment, a fixed number of the selectively inverted series of digital data values 119 are added together (i.e., the number of "ONE" bits in each byte is added to an accumulator) to generate a SAMPLE_RESULT 211. In one such embodiment, 1024 bits of the selectively inverted series of digital data values 119 are processed, counting the number of "ONE" bits. In one such embodiment, the number of "ONE" bits in one byte is added to the accumulator, and the value "four" is subtracted (four being the expected mean of the number of one bits in eight random bits) for each of 128 bytes, in order to generate a SAMPLE_RESULT 211 having a mean of zero and a value equal to the deviation the number of "ONE"s of that sample from the expected mean of 512. In one embodiment, one or more values of SAMPLE_RESULT 211 are stored in storage 220 for later use. In other embodiments, additional statistical analysis is performed by variance accumulator 210, such as determining the time differential or integral of values of SAMPLE_RESULT 211 or of values of signal 130, and optionally storing values representing these statistical analysis in storage 220. In one embodiment, decision maker and controller 250 is a circuit configured to make a logical decision based on one or more of: the selectively inverted series of digital data values 119 on signal 130, SAMPLE_RESULT 211, or values stored in storage 220, and to generate one or more control signals 251 to control a result. In one embodiment, the result controlled includes controlling heating-ventilating-air-conditioning (HVAC) controller 243 that in turn controls HVAC equipment 244 to, e.g., control air temperature in a building, or a fan's speed. Other such embodiments allow control of a temperature of a gaseous, liquid (such as the water in a waterbed) or solid material (such as a heating pad). In another embodiment, the result controlled includes controlling light controller 233 that in turn controls lights 234 in order to control a light intensity or color (such as mood lighting dimming). In yet another embodiment, the result controlled includes controlling motor controller 533 that in turn controls motor 534 in order to control, for example, movement in a toy. In still another embodiment, the result controlled includes controlling audio/video controller 525 that in turn controls speakers 524 in order to control the sound produced (i.e., program, station, device or channel selection), or its intensity. In one embodiment, audio/video controller 525 includes a remote-control receiver of a television, stereo, or other home-entertainment device, and the result controlled is, e.g., the channel selection for the television or the sound loudness, etc., and decision maker and controller 250 includes an infra-red transmitter and encoder compatible with the remote-control receiver of audio/video controller 525. In still another embodiment, the result controlled includes controlling video-game program 550 that in turn controls video display 514 and/or speakers 524 in order to control the picture and/or sound produced (i.e., the control of game flow or operation or selection), or the sound loudness or timbre, or light intensity of the computer-generated image.

In still another embodiment, the result controlled includes controlling a video display or printed output of a computer in order to display a computer-controlled indication of an emotional or volitional state of one or more persons. Otherwise anomalous results of experiments statistically indicate a strong correlation between the emotional or volitional state of one or more persons and the results displayed. One use for such an indication is to provide a non-invasive sample of public opinion. Another use for such an indication is to provide a computer-controlled indication of a mental or physiological state of one or more persons, particularly if that person is unwilling or unable to otherwise communicate (such as a mentally disturbed person).

FIG. 4 is a block diagram of one embodiment of the electronics of field-random-event generator 100. The analog circuit section 110 of the board contains a noise source 102 (such as a resistor or diode producing "Johnson" noise) and a multi-stage amplification and clipping circuit 108 that includes one or more amplifier stages 104 through 106. The resulting analog signal 109 has a white noise spectrum that is flat within approximately one dB over the frequency range from 500 to 30,000 Hz. Analog signal 109 is compared with a DC reference level, $V_{REF}$ 111, yielding a digital output 115 that is 3.6 volts (a logical ONE) when the analog input exceeds the reference voltage and 0.4 volts (a logical ZERO) when it does not. This digital output signal 115 passed to the digital circuit section 120 where it is periodically sampled by an edge-triggered flip-flop 114 that locks in (or holds) a sampled bit of 1 or 0 from an edge of clock 113 of until the next such edge, thus for one clocking period. In one embodiment, sampling rate of clock 113 is 1000 samples per second. In one embodiment, this continuous sequence of bits 117 is then passed through a "template" stage 118 to produce an "alternated" sequence, in order to preclude first-order bias of the mean due to short- or long-term drift in any analog component values. In one such embodiment, template stage 118 exclusive-ORs the sequence of bits 117 with an alternating template series of ones and zeros (i.e., 0, 1, 0, 1, 0, 1, . . . ) so that every second bit is logically inverted (e.g., all even-numbered bits are inverted and all odd-numbered bits are not; or all odd-numbered bits are inverted and all even-numbered bits are not). In another such embodiment, template stage 118 exclusive-ORs the sequence of bits 117 with a pseudo-random template series of ones and zeros (e.g., a predetermined stored sequence of numbers having known statistical parameters such as 50% zeros and 50% ones such as pseudo-random sequence mask 299 shown in FIG. 3) so that bits of bit sequence 117 are toggled according to the template series. In one such embodiment, the pseudo-random template series is stored as digital values in a table in computer memory.

This "alternated" sequence of bits 119 is then acquired by an 8-bit shift register 122, whose content is transferred at 18 millisecond intervals to a UART chip 124 for asynchronous transmission as a data byte in a sequence of data bytes. Serial-out signal 130 provides these bytes which are transmitted to the serial port of the computer at 9600 baud in one embodiment, where they are read and converted to REG data by dedicated software running in computer 99.

In one embodiment, the digital circuit section 120 and analog circuit section 110 of field-random-event generator 100 are isolated from each other spatially, and the geometry is fixed by using printed circuitry. No digital operations are performed during each time period of the analog sampling, in order to avoid any electrical cross-over. In addition, a separate, external power supply 101 is used to minimize electromagnetic fields within the box of field-random-event generator 100. Although field-random-event generator 100 is protected against most external sources of electromagnetic interference, it should not be installed immediately adjacent to the video display terminal of computer 99 where strong magnetic fields may be expected. In one embodiment, field-random-event generator 100 is provided with a four foot cable and a nine pin serial connector; adapters are available to connect such a 9-pin connector to a 25 pin serial port.

In one embodiment, settings of one or more internal dip-switches 142 allow different sampling and byte generation rates and other adjustments, but these options are used only in testing and setup for initial calibration, and switch settings should not be changed without subsequent calibrations. A potentiometer 144 is used to adjust the reference voltage, and its setting also should not be changed. Note that alteration of any settings of dip-switch 142 or potentiometer 144 will nullify calibrations previously performed and may affect nominal performance. In one embodiment, field-random-event generator 100 is designed for use with specific software 300 (see FIG. 17 description below), which assumes nominal calibrated settings.

Figure 5A:
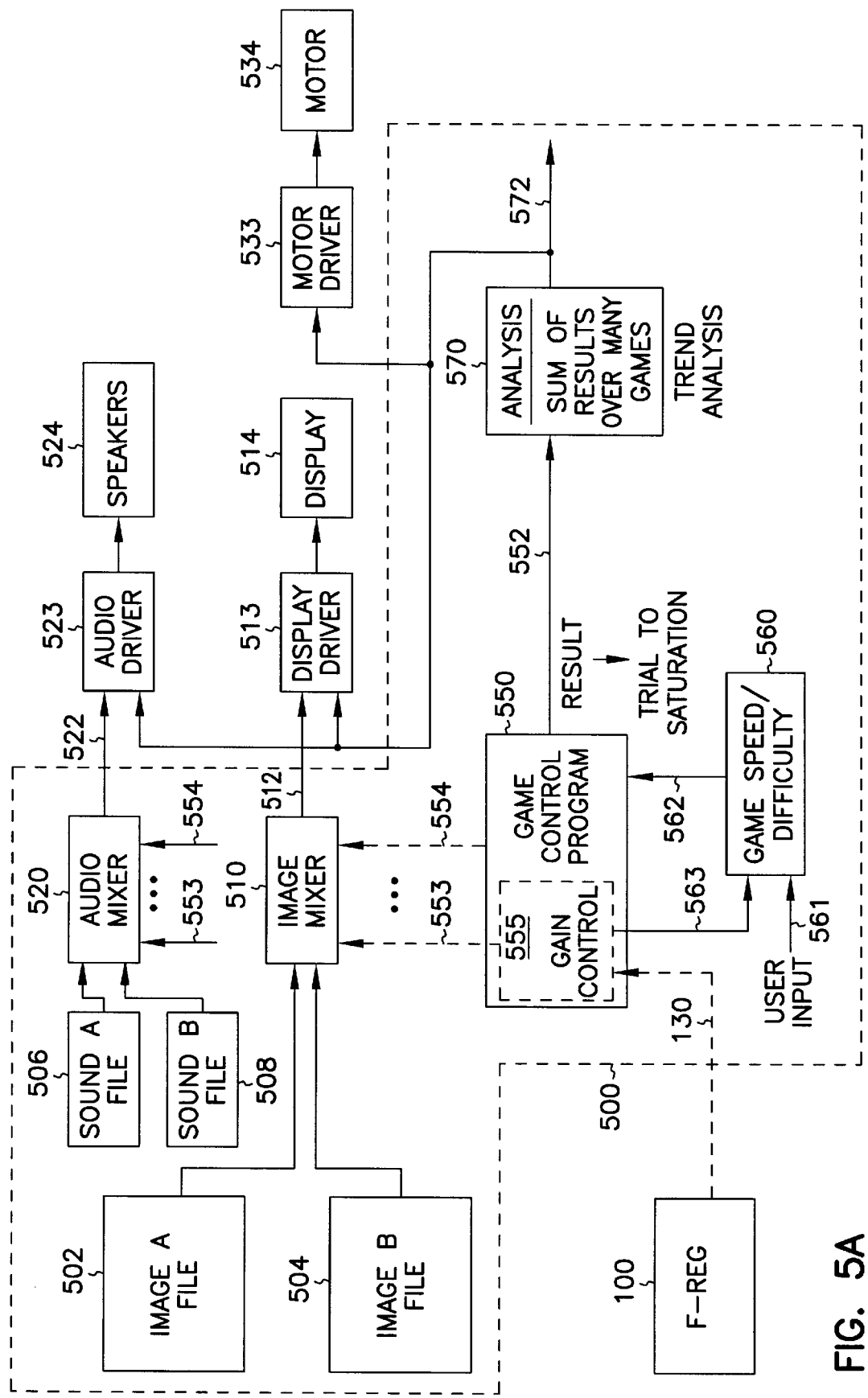
FIG. 5A is a block diagram of one embodiment of image-blender program 500 that takes input from F-REG 100 and generates an image display output 512 and analysis output 572.

FIG. 5A is a block diagram of one embodiment of image-blender program 500 that takes input from F-REG 100 and generates an image display output 512 and analysis output 572. The overall purpose of image-blender program 500 is to "blend" two images, Image A and Image B, into a single Composite Image that is then displayed onto display 514 of computer 99. The blended image is changed over time to include more of one or the other image, based on the values generated by F-REG 100. If a series of values from F-REG 100 overwhelmingly goes in one direction or the other, the resultant picture displayed will "saturate" with the corresponding image (either Image A or Image B, depending on whether the values indicated more zeroes or ones). In one such embodiment, a "game of chance" is thus produced, in which the user is given the impression (or perhaps the reality) that they control the game by conscious intention. In one embodiment, a user is encouraged to attempt to control the numbers generated by F-REG 100, thus producing either the effect or the appearance of conscious control of the image displayed. In another embodiment, two users "compete," each trying to use conscious intention to force the values from F-REG 100 to go in their respective favor; and if one image saturates, the game stops with that image displayed, and the corresponding "player" is declared the winner. In one embodiment, a series of such games is scored to comprise a match, with each player trying to win as many games within the match as possible and achieve the best score.

Figure 5B:
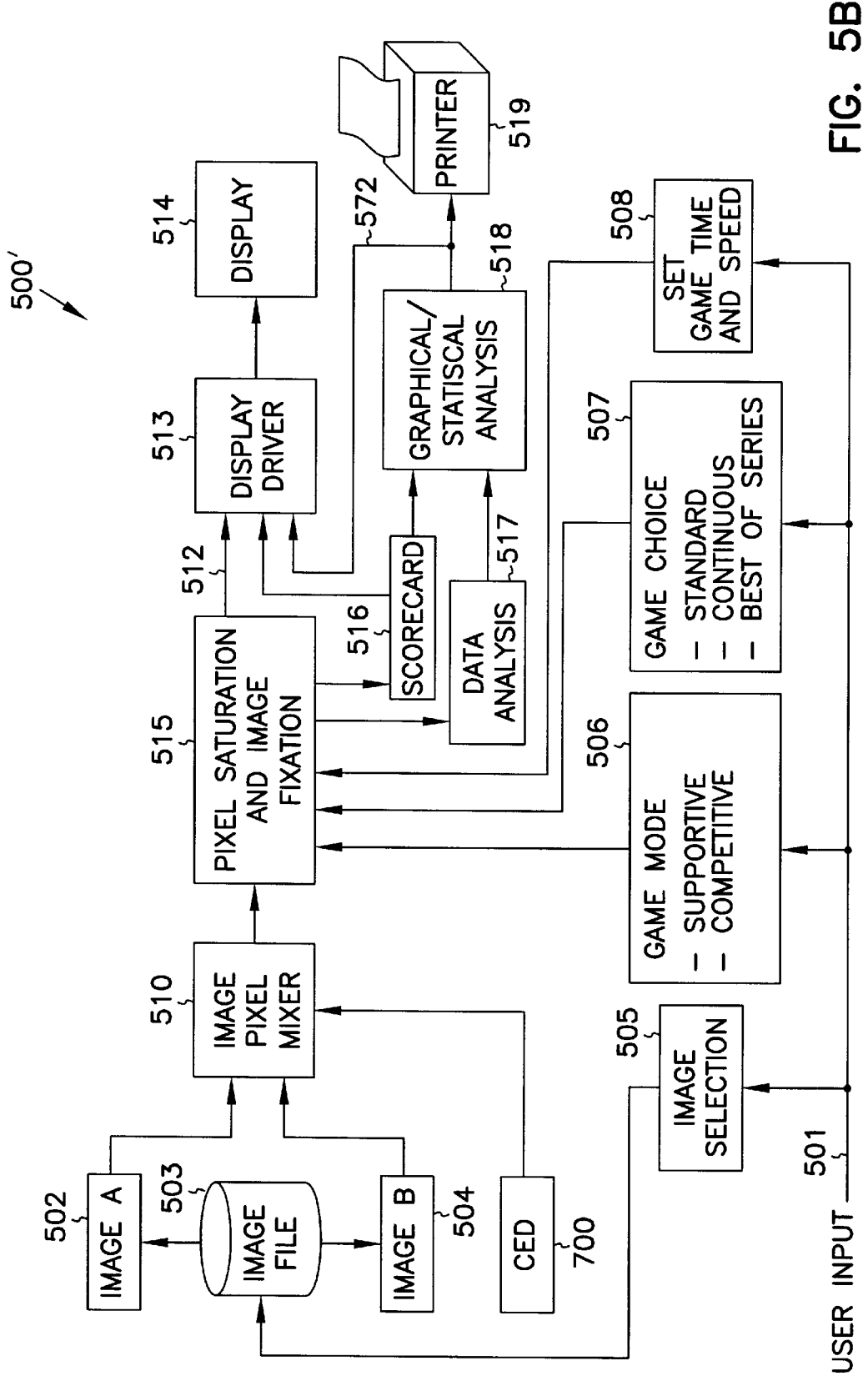
FIG. 5B is a block diagram of one embodiment of image-blender program 500' that takes input from CED 700 and generates an image display output 512 and analysis output 572.

FIG. 5B is a block diagram of one embodiment of image-blender program 500' that takes input from CED 700 and generates an image display output 512 and analysis output 572. Image A 502 and Image B 504 are selected from image file 503 (that has a plurality of various images such as photographs of mountains, beaches, buildings, planets, etc.) under control of image selection logic 505 and user input 501. User input 501 also drives game mode 506 which specifies whether the game is to be "supportive" wherein players try to achieve a common goal (all trying to get the same image to saturate), or "competitive" wherein each player tries to achieve separate goals (each trying to get his or her own picture to saturate). User input 501 also drives game choice 507 which controls whether the game in played in standard mode (manual user input starts each game, and the game runs until one image saturates and completely replaces the other image(s); continuous mode (a new game automatically starts after the previous game ends); or best of series (a new game automatically starts after the previous game ends until one player has won a predetermined number of games, e.g., four out of seven). In one embodiment, more than two images are mixed, representing the corresponding number of players. User input 501 also drives game time 508 which determines the time each game will run, and/or the speed of change (i.e., the sensitivity to deviations) in each game. In the embodiment shown, image pixel mixer 510 selects pixels to be displayed from the corresponding pixel of Image A or Image B depending on deviation values provided by CED 700. In this embodiment, image pixel mixer 510 drives pixel saturation and image fixation block 515. In one embodiment, the magnitude of deviation in one direction or the other determines the number of pixels that will be switched, and the determination of which pixels to change is based on a random or pseudo-random criteria, in order that portions of the entire resultant image are evenly changed. After "enough" values from CED 700 have been received to achieve an overall net deviation meeting a certain predetermined threshold, the resultant image will "saturate" to be either Image A or Image B, with no pixels of the non-selected image being displayed. Mixed image signal 512 then drives display driver 513 and display 514. Pixel saturation and image fixation block 515 also drives scorecard 516 (which keeps track of how many times each player has won), data analysis 517 (which tracks the statistical significance and other statistical attributes of the values from CED 700), and/or graphical/statistical analysis 518 (which provides a graphical or textual display of the results onto display 514 or printer 519).

In other embodiments, one or more users (or "players") attempt to influence the output of F-REG 100 or CED 700, with feedback provided by visual output (such as a graphical representation of the values being plotted versus time, or other visual indications of the direction and/or magnitude of the deviations, and, in some embodiments, a simultaneous display of the statistical significance of the deviations), audio output (sounds, music, spoken words or other sound effects, whose blending, pitch, volume, or other content is determined by the random values), or mechanical output (such as movement of a robot, car, stuffed animal, fountain, mobile, drum stick, chimes, or other mechanical device).

In various embodiments, computer 99 is either a personal computer and display such as an IBM-compatible computer, or a video-game-computer and television set combination, such as a Nintendo™ game, or a handheld game with an integrated LCD display such as a Nintendo™ Gameboyv game or Hewlett-Packard palmtop computer.

As described above, in one embodiment, CED 700 generates output signal 130 which contains a random number that is between 0 and 255. In this embodiment, not all of the numbers 0 through 255 are equally probable; rather, there is a binomial distribution (which approaches a Gaussian distribution as the number of binary bits that are counted increases) having a mean value of approximately 128 and a standard deviation of approximately eight. In another embodiment, 1024 bits are counted and 512 is subtracted (and, in one embodiment, the result truncated if necessary, such that values smaller than −128 are replaced with −128, and values larger than +127 are replaced by +127) to generate an eight-bit two's complement number (i.e., a number between −128 and +127 inclusive) having a mean value of zero and a standard deviation of 16. In one such embodiment, the process involves counting eight bits, subtracting four from the result, and adding the result to the accumulated total, until 128 groups of eight bits are counted, with four subtracted from each group's result before adding that result to the total. Since overflow or underflow occurs at approximately eight standard deviations from the mean value, there is only a very small chance that the result will overflow or need to be capped or truncated to −128 or +127 as described above.

Signal 130 is fed into gain control 555 portion of game-control program 550. Game speed and difficulty control section 560 provides gain output 562 which is fed to game control program 550, and is used to provide a rate-of-change which reinforces the user into playing the game. (Too slow a rate of change or action, and the user gets bored and stops playing; too fast a rate of change or action, and the user gets frustrated because it doesn't appear that the conscious effort is proportional to the results obtained.) Game speed and difficulty section 560 receives user input 561, by which a user can specify the speed or difficulty of the game he or she is playing. A higher gain provides more action in the game. On the other hand, a lower gain setting will provide a game which is more difficult or which requires further excursions from the mean by the random numbers from F-REG 100 or CED 700 in order to provide a given amount of action or results. In one embodiment, gain control section 555 also provides a standard deviation output 563 which is used to dynamically modify the gain setting of game speed and difficulty section 560, in order to provide or maintain an optimal level or reinforcing feedback to the user of the game. In one such embodiment, as the user "gets better" at "generating control" over the random values from F-REG 100 or CED 700, this feedback makes the game harder (a smaller gain means more deviation is needed to effect a given change), and as a user "gets worse" at controlling the random values, the gain is increased.

Game control program 550 provides a series of control output signals 553–554 which control the operation of image mixer 510. Image mixer 510 takes data from Image A file 502 and Image B file 504 and combines the images based on control signals 553–554 to generate an output Composite Image signal 512. Output Composite Image signal 512 controls display driver 513 which, in turn, produces an overall Composite Image on display 514 of computer system 99. In one embodiment, picture elements from image A file 502 and image B file 506 are selected on a picture element by picture element basis by image mixer 510 based on control signals 553–554. Thus, the image on display 514 will be a mixture of individual picture elements from image A file 502 interspersed with image elements from image B file 504. In one embodiment, each picture element on display 514 is selected from the corresponding location of either image A file 502 or image B file 504 based on the number generated by F-REG 100 or CED 700 and gain control 555. In one such embodiment, the address of which picture element (pel) is changed is determined by a value from F-REG 100. In another such embodiment, individual picture elements on display 514 are selected as a mixture of the corresponding near-by image elements from image A file 502 and image B file 504 in a hybrid mixture (e.g., if the random numbers from F-REG 100 are in the "A" direction, the pictures will more resemble Image A). In another embodiment, a morph-type combination of Image A file 502 and Image B file 504 is displayed. In other embodiments, other combinations, morphs, or composites of the two images, as are known in the art, are generated with the "amount" of one image or the other controlled by the values from F-REG 100.

In one embodiment, control signals 553–554 also control audio mixer 520 which mixes sounds from two sound files, sound A file 506 and sound B file 508. The output 522 of audio mixer 520 is also provided as an input to audio driver 523 and thus drives speakers 524. In one such embodiment, the volume of sound A file 506 is adjusted relative to the volume of sound B file 508 by audio mixer 520 based on control inputs 553–554. Thus, numbers generated by F-REG 100 and gain control 555 control the dominance of one sound over another. For example, if the numbers out of F-REG 100 and gain control 555 tend towards all ones, a positive deviation is detected and the sound from sound A file 506 will saturate and be the only sound driven to speakers 524 while the sound from sound B file 508 will have zero volume and will not be heard from speakers 524. On the other hand, if the numbers from F-REG 100 and gain control 555 tend to be dominantly zeros, a negative deviation is detected and the sound from sound B file 508 will saturate and be the only sound driven to speakers 524 and sound from sound A file 506 will not be heard at all.

Game control program 550 also produces result output 552 which represents the time needed for a trial to run to saturation. Result output 552 is driven to analysis section 570 which produces the sum of results over many games. Analysis section 570 provides a trend analysis which shows the result of playing games over a period of time. Analysis output 572 from analysis block 570 is fed to display driver 513 for display on display 514. In one embodiment, analysis output 572 also drives motor driver 533 which, in turn, drives motor 534 to produce some mechanical output from a toy being driven by program 500. In another embodiment, analysis output 572 also drives audio driver 523 which produces sound, music or voice on speakers 524, in order to provide the user with feedback at how "well" he or she is doing.

In one embodiment, an "ARTREG" experiment uses a library of 20 video images prepared with software that renders scanned images into a 640 by 480 pixel matrix in a format readable by the image mixer 510 program. Two video images are selected by the user from the library and super-imposed in the display, with 50% of the pixels assigned to each of the two pictures. Samples from the CED 700 are taken, and deviations from the expected mean are used to determine a number of pixels to reassign from one image to the other.

To begin an experiment, the user or operator selects two images to be used for the session. Each of the 20 pictures can be displayed with an option to either select that picture or make a different choice. After specifying the two images, the operator chooses one as the target for a run of trials during which he or she intends that the target will accumulate 100% of the pixels and saturate or take over the screen. The run proceeds until this occurs, or until 250 trials have been taken without either picture saturating. The operator then chooses one of the two images as the target for the next run, and proceeds. The reassignment of pixels in each trial is pro-portional to the deviation of that trial from expectation For each run, a new random decision is made that determines the direction of reassignment according to the sign of the cumulative deviation. There are a total of 2000 trials in a session, and for 1000 of these, shifting pixels to a given picture (say, A) will occur for positive deviations (high numbers), and for the other 1000 trials pixels will shift to A for negative deviations. The assignment of one of the two pictures to a particular direction of deviation is randomly determined in the background for each run, so that neither operator nor experimenter knows whether success in the direction of intention will correspond to high or low numeri-cal scores, The operator need not balance the choice of pictures, and may choose one picture for most or all of the intentional targets in a session. Each run ends when the display is saturated with one picture, or after an arbitrary maximum of 250 runs (about 4 minutes). Some runs will have a shorter maximum duration because the 1000 trials for a given direction of deviation have been nearly all used. The program prints a message indicating that such a run is impending.

The program does not require connection to a printer for hardcopy but the formal experiment does require a complete logbook record summarizing the outcome for each run. The logbook header for a session indicates the operator number, the session number, date and time, and the names of the two chosen target pictures. Each run ends with a message on the screen to proceed by pressing any key. Summary informa-tion about the run is then displayed, and must be copied into the logbook by the operator. The information shown for each run includes the number of trials, the mean deviation, the standard deviation, and the file number. The logbook entry for the run should also indicate the intended picture, and space should be left for the experimenter to note the ran-domly assigned high or low score direction for each run. All this information is registered automatically in the index file generated for the session, but the logbook records provide redundancy and allow cross checking during analysis.

ARTREG experiment data can be analyzed with regard to "intentional data", the high and low deviations that are accumulated, using REGSTAT as detailed in the following section. However, analysis with regard to "categorical data", that is, the intentions as defined by the choice of target picture, requires a more complex statistical package. In one embodiment, four routines are used: (1) the first scans index and data files. For each series, it creates a database-format file. These files are in the 4096 byte "series block" format used by PEARDBS, but they must be concatenated by a separate utility to use PEARDBS on them. (2) The second reads the named file, presuming it to be in series block format, and prints text to standard output giving index information (operator number, etc.), a run-by-run summary, and summaries of intentional data and categorical data. The output is only to the screen unless it is redirected to a file. (3) The third reads the named file. It prints an overall summary of the combined results of all series summarized in the given file. (4) The fourth invokes the first to create *.SES files for every series (session) currently on record. It then invokes SUMMARY on every *.SES file that results, redi-recting output to an intermediate text file named OPSTA-TUS.TEX. It finally invokes OPSUM on OPSTATUS.TEX to produce a full-database summary which is printed to the screen. Redirection may be used to write the summary to a file. The file OPSTATUS.TEX is left on the disk and can be viewed or printed for a more detailed summary. Typing OPSUM OPSTATUS.TEX can provide the overall summary again without rerunning the intermediate stages. In the most typical usage, ARTSUMRY is simply typed with no arguments to produce a summary of all operator data in the current directory.

Figure 6A:
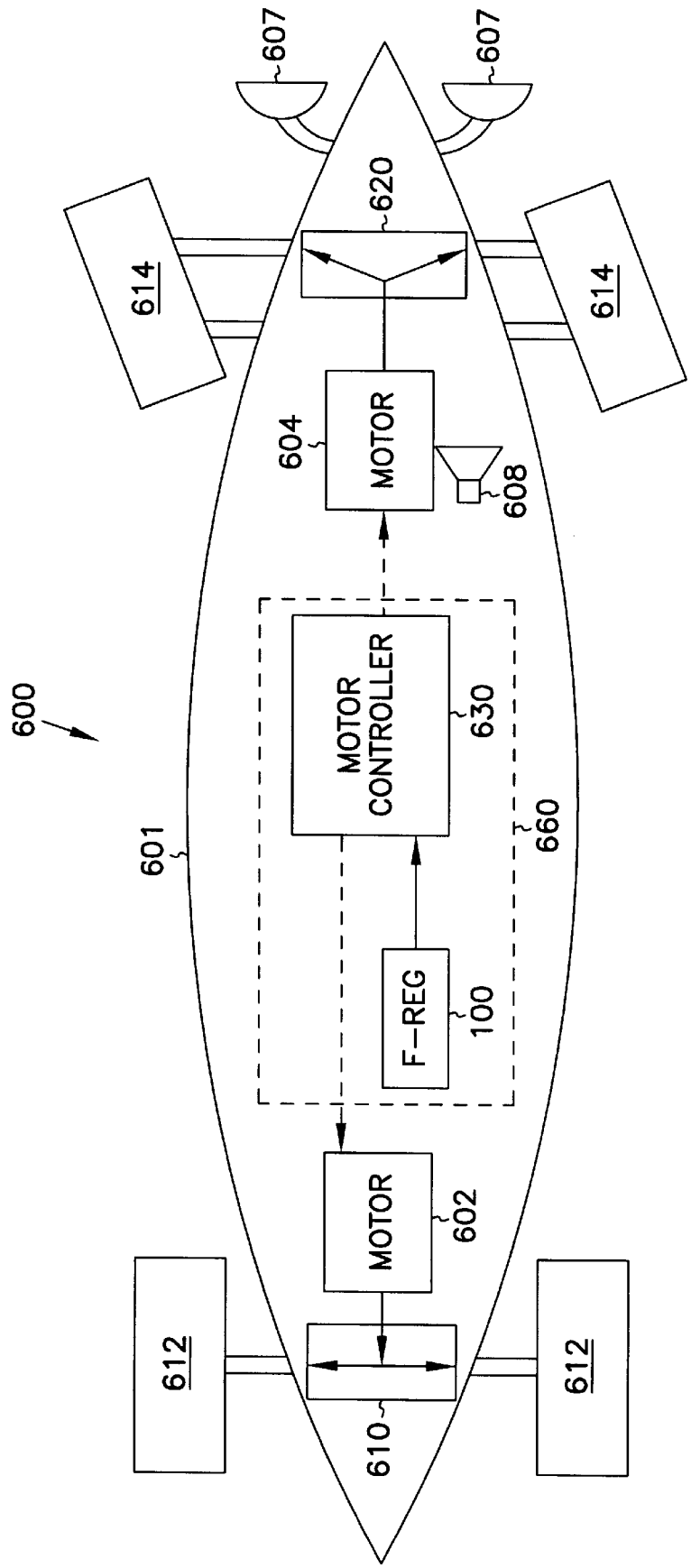
FIG. 6A is a block diagram of a toy 600 controlled by toy controller 660.

FIG. 6A shows one embodiment of a toy 600 according to the present invention. In this embodiment, toy 600 is a race car-shaped toy that includes an on-board F-REG 100 controlling motor controller 630 which, in turn, controls motors 604 and 602. Motor 602 controls rear transmission 610 which drives rear wheels 612. Motor 604 controls steering mechanism 620 which, in turn, controls the direction of steering wheels 614 in the front of the car toy 600.

Figure 6B:
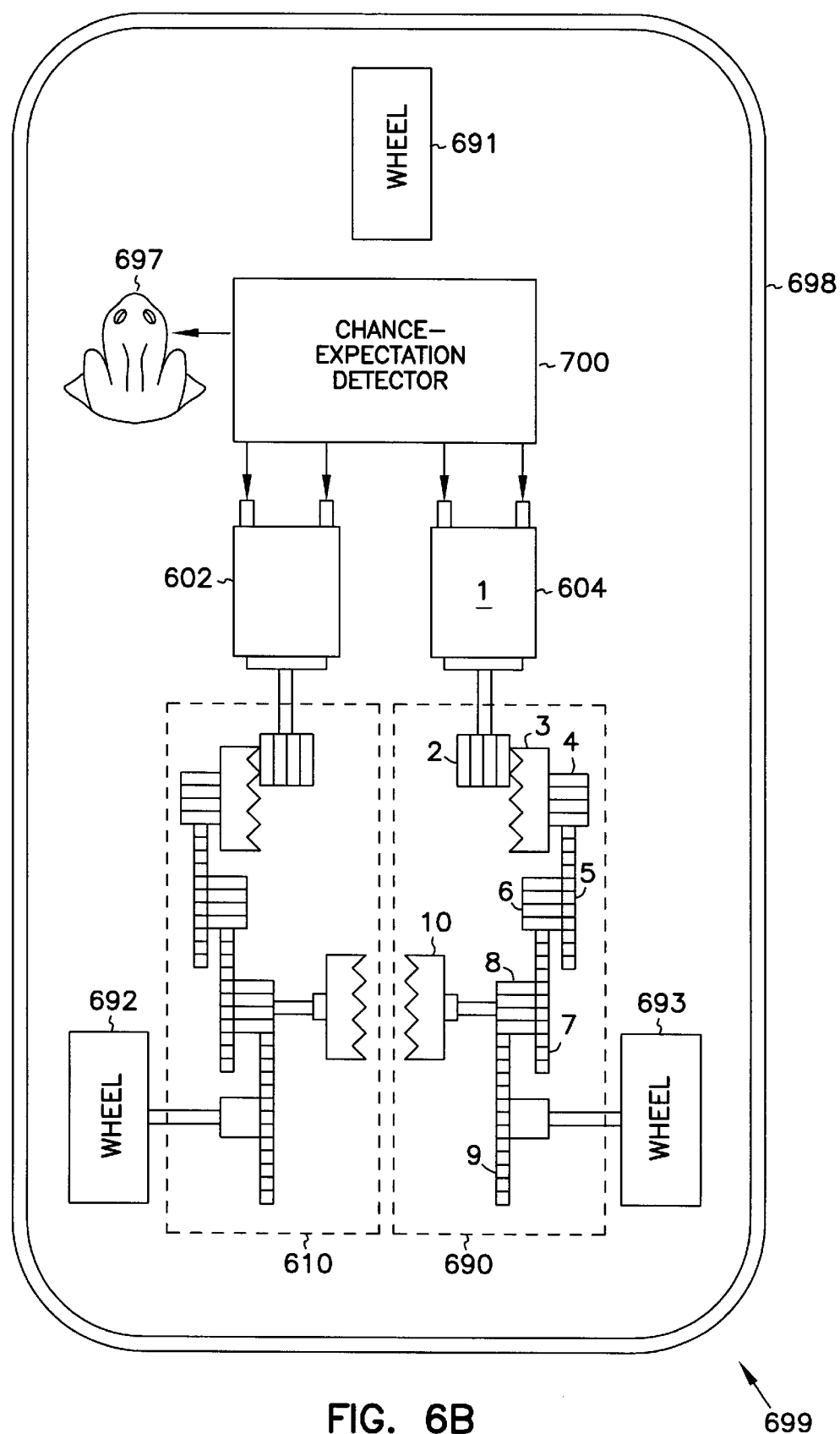
FIG. 6B is a block diagram of a toy 699 controlled by toy controller 660.

FIG. 6B shows another embodiment of a toy 699 according to the present invention. In this embodiment, toy 699 is a rounded toy that includes an on-board CED 700 which, in turn, controls motors 604 and 602. Motor 602 controls transmission 610 which drives one of two drive wheels 692. Motor 604 controls transmission 690 which drives the other one of two drive wheels 693. Steering and movement is controlled by the difference in speed, and the absolute speed and direction, respectively of toy 699 which, in turn, controls the direction of steering wheels 614 in the front of the car toy 600. In one embodiment, pivoting wheel 691 pivots about a vertical axis, and rotates about a horizontal axis, providing a passive balance point to accommodate steering and linear motion driven by wheels 692 and 693. In one embodiment, parts from or similar to those in a MOVIT 961 (WAO II)- type motorized robot (available from OWI Inc., 1160 Mahalo Place, Compton, Calif. 90220, phone (310) 638-4732) are used for the respective motors, transmissions, and wheels, as well as shell 698 of toy 699. In one embodiment, a "cute" abstract figure (such as a stuffed toy frog 697 or other such cartoon-ish or abstract figure) is provided as a passenger riding toy 699. In one such embodiment, toy 697 is also coupled to CED 700 in order to, for example, light its eyes, move, or make a "cute" croaking sound.

In FIG. 6B the following reference numerals represent motor and gear functions as follows:

1. Motor
2. Pinion Gear (12)
3. Crown Gear (24) with Pinion Crown Gear (24 teeth)
4. Crown Gear with Pinion (12) Pinion Gear (12 teeth)
5. Flat Spur Gear (32) with Pinion
6. Flat Spur Gear with Pinion (12 teeth)
7. Flat Spur Gear (36) with Pinion
8. Flat Spur Gear with Pinion (12)
9. Flat Spur Gear (40) with Boss
10. Crown Gear (24) with Boss Note: The numbers in () are the number of teeth in the gear.

Figure 7A:
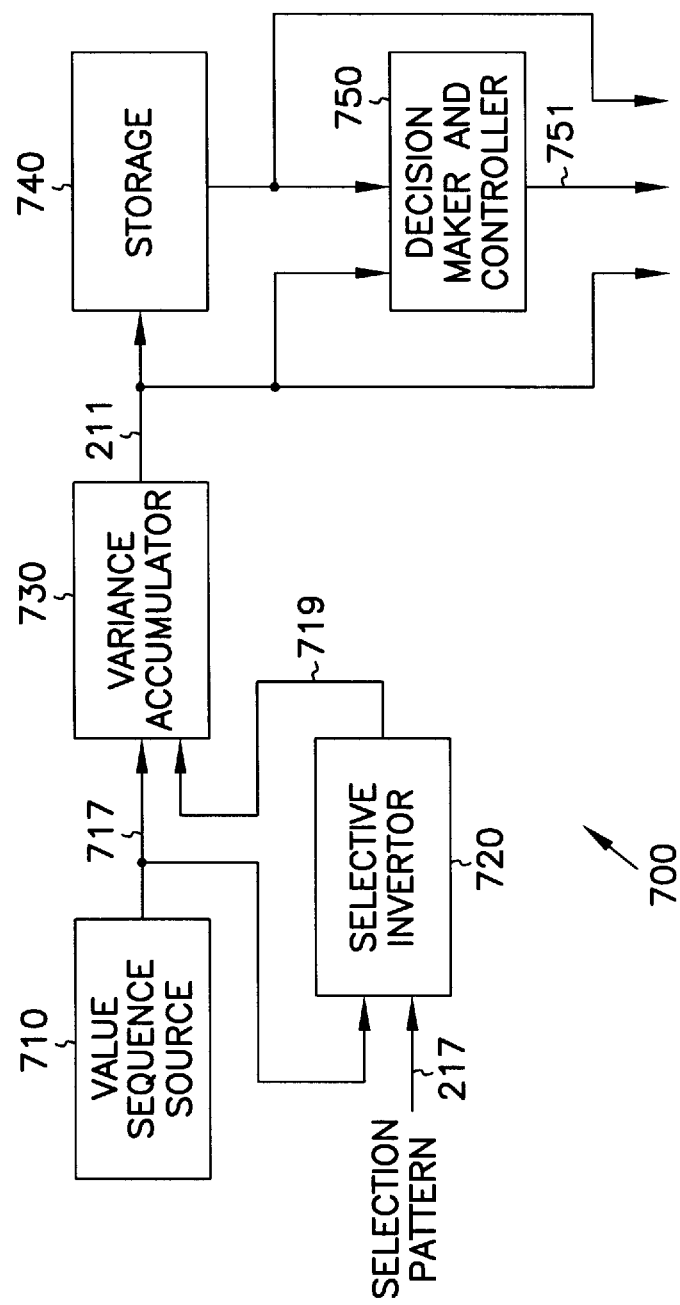
FIG. 7A is a block diagram of one embodiment of chance-expectation-detector apparatus 700 for distinguishing noise or random events which collectively exceed chance expectations and thereby controlling an output.

In the embodiment shown in FIGS. 6A and 6B, toy controller 660 is a combination of F-REG 100 (such as diagramed in FIG. 2) connected to on-board motor controller 630. In another embodiment, chance-expectation-detector 700 as shown in FIG. 7A replaces F-REG 100. In still another embodiment, chance-expectation-detector 700 as shown in FIG. 7A replaces both F-REG 100 and toy controller 660. In one embodiment, car toy 600 includes one or more lights 607 which are controlled based on values generated by F-REG 100 or CED 700. In one embodiment, car toy 600 includes one or more speakers 608 which are controlled based on values generated by F-REG 100 or CED 100.

Figure 6C:
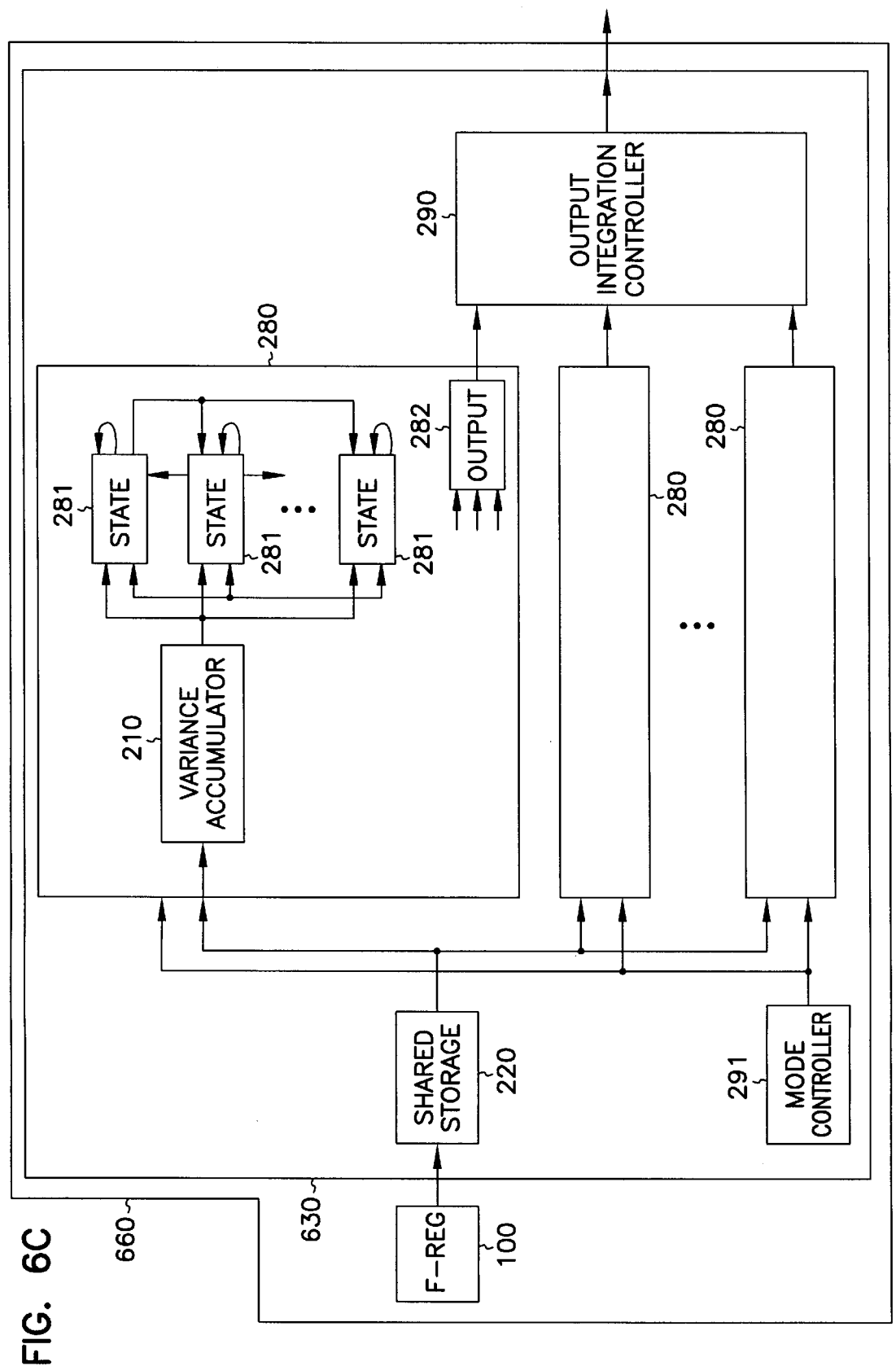
FIG. 6C is a block diagram of a toy controller 660.

In one embodiment shown in FIG. 6C, a state machine is used within toy controller 660, and transitions between states are based on values provided by F-REG 100 and/or CED 700 and a state-ransition matrix that specifies a sequence of threshold values and a specified subsequent state corresponding to each threshold value. In one such embodiment, a set of discrete-state tasks 280, each task 280 including a variance accumulator 210 a plurality of states 281, each state 281 having (i) a lifetime (determined by a having a set number of values to accumulate), (ii) a transition matrix that specifies a sequence of threshold values that trigger transitions to other states (e.g., a value having a deviation exceeding one standard deviation would cause a transition to one state, while if it exceeded two standard deviations, a different transition would be specified), and (iii) an output value 282. In one embodiment, as shown in FIG. 6C, an F-REG 100 continuously places random values into shared storage 220. One or more discrete-state tasks 280 (each implemented as an executable software object) each read values from shared storage 220 into their variance accumulators (wherein each can accumulate from different values—e.g., one task 280 could read the first group of 1024 values and the next task 280 could read the next group of 1024 values, or each can accumulate overlapping values but different numbers of values—e.g., one task could accumulate 256 values at a time, while the next task 280 accumulates 1024 values at a time). Thus each task 280 can generate outputs based on various different statistics in the series of random values generated by F-REG 100. The outputs of the tasks 280 are then combined by output integration controller 290 that generates control signals for, inter alia, motors 602 and 604.

FIG. 7A shows a high-level block diagram of one embodiment of chance-expectation-detector ("CED") 700 for distinguishing noise or random events which collectively exceed chance expectations and thereby controlling an output according to the present invention. In this embodiment, CED 700 includes value sequence source 710, variance accumulator 730, storage 740, and decision maker and controller 750, and optionally includes selective invertor 720. In one embodiment, value sequence source 710 includes an F-REG 100. In another embodiment, value sequence source 710 provides values indicative of a measured physical process (for example, wind speed, direction, and/or temperature). Value sequence source 710 may also contain a bias caused by one or more external fields, temperatures, or other sources of bias such as human volitional or emotional state. In one embodiment shown, value sequence signal 717 provides a sequence of digital values. In another embodiment, value sequence signal 717 is an analog signal. In one embodiment, value sequence 717 is coupled through selective invertor 718 that selectively inverts some of the series of digital data values 717 (as selected by selection pattern 217) to generate a selectively inverted series of digital data values 719. (For an analog signal 717, selective invertor 720 performs an analog inversion. For a digital signal 717, selective invertor 718 performs in the same way as selective invertor 118 described above for FIG. 2.) Signals 717 and/or 719 are then coupled to variance accumulator 730. Variance accumulator 730 performs one or more statistical analyses on signals 717 and/or 719. If these signals are digital signals, variance accumulator 730 performs in the same manner as variance accumulator 210 described above for FIG. 2. If these signals are analog signals, variance accumulator 730 performs a corresponding analog function, for example performing a time integration for a set period of time to determine the deviation of the analog signal from an expected mean value, in place of counting the number of ONE bits in a set-length string of bits. The results (i.e., SAMPLE_RESULT 211 or values representing other statistical analysis) from variance accumulator 730 are optionally stored in storage 220. In one embodiment, decision maker and controller 750 is a circuit configured to make a logical decision based on one or more of: SAMPLE_RESULT 211, or values stored in storage 740, and to generate one or more control signals 751 to control a result.

Figure 7B:
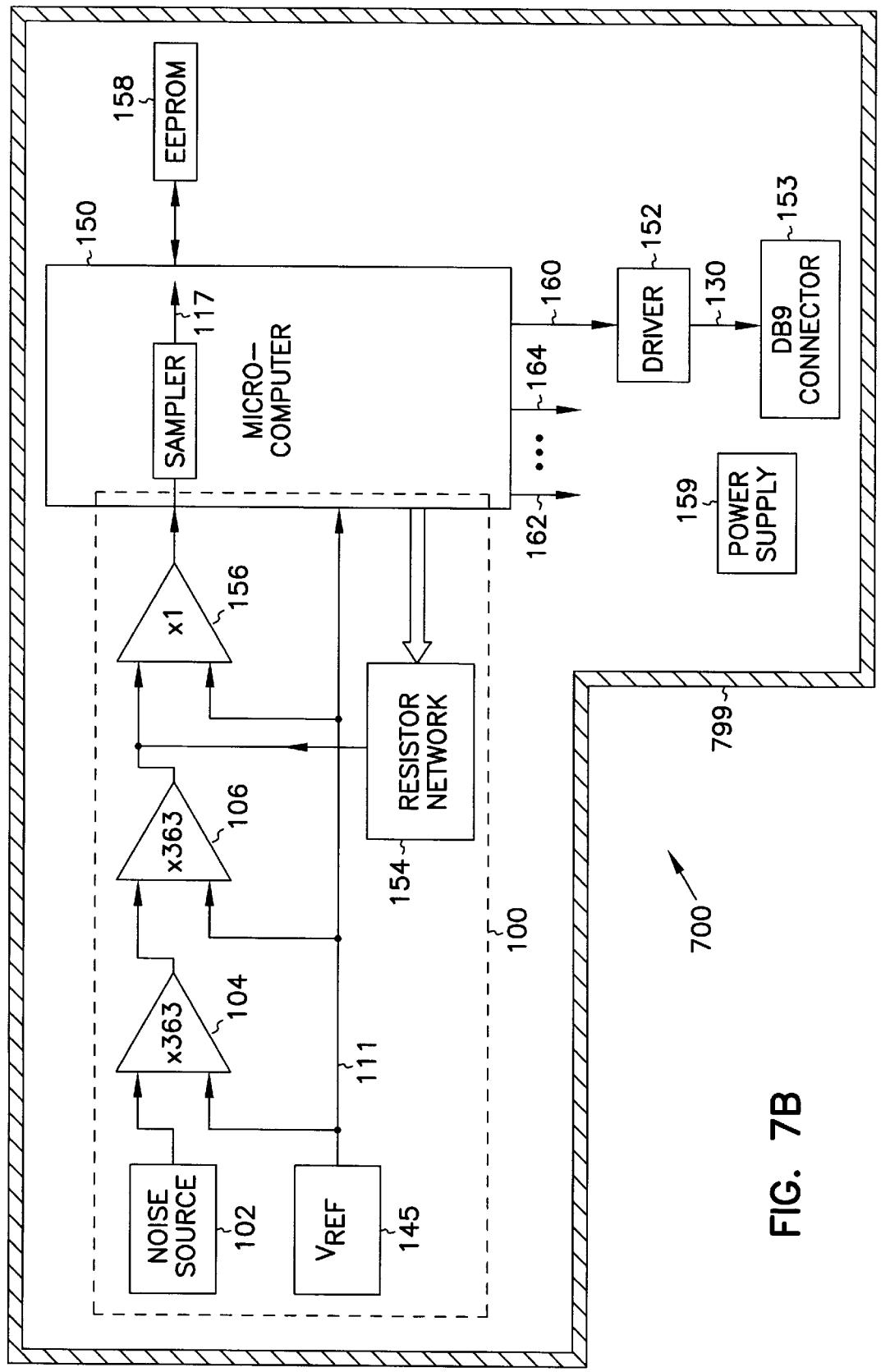
FIG. 7B is a block diagram of another embodiment of chance-expectation-detector apparatus 700, this embodiment using a microprocessor 150 to perform one or more of the functions described in FIG. 7A.

FIG. 7B shows a high-level block diagram of one embodiment of chance-expectation-detector 700 according to the present invention. This embodiment uses a microprocessor 150 to perform one or more of the functions described in FIG. 7A. In one embodiment, chance-expectation-detector 700 is a portable stand-alone unit constructed on a printed-circuit card approximately 1.75×3.5 inches and enclosed in an aluminum shielding enclosure 799. In one such embodiment, chance-expectation-detector 700 is powered by a battery also housed in the aluminum enclosure. Chance-expectation-detector 700 includes noise source 102 which drives the series of amplifiers 104, 106 and 156. Voltage reference $V_{REF}$ 145 provides a voltage reference 111 which is also provided to amplifier string 104, 106 and 156, and to microcomputer 150. The output of amplifier 156 is driven into microcomputer 150. Microcomputer 150, in turn, drives resistor network 154 which provides an offset current which is added into the output of amplifier 106 at the input node of amplifier 156. In one embodiment, microcomputer 150 is used to calibrate the noise source and amplifier string in order to generate an offset current from resistor 154 which provides a desired mean for the noise source 102 and amplifier string 104, 106 and 156. In one embodiment, the calibration is done once in the manufacturing process, and saved into EEPROM 156. In one embodiment, the value needed to drive resistor network 154 in order to generate the proper offset current is stored in EEPROM 158, and read into microcomputer 150 each time the chance-expectation-detector 700 is started. One or more outputs (160, and 162 through 164) provide values representing counts of random binary values from F-REG 100, values based on the statistical significance of deviations of these counts from the expected mean, or values based on trends (such as time differential or time integral values) of these counts or deviations, and are used to provide feedback to a user and/or to control various visual, audio, or mechanical outputs.

In one embodiment, output 160 provides values which are generated and analyzed by chance-expectation-detector 700 and driven through driver 152 (which in one embodiment, is an RS232 driver) to provide signal 130. In one embodiment, signal 130 is connected to a wire with a DB9 connector 153 at the end for connection to computer 99, as shown in FIG. 1. In another embodiment, signal 160 is coupled to an infra-red transmitter (in place of driver 152) and wirelessly coupled to an infra-red receiver coupled to, e.g., computer 99 (see FIG. 1) or toy 900 (see FIG. 9). Also shown in FIG. 7B is power supply 159 which provides power for the other components in chance-expectation-detector circuit 700. In one embodiment, power supply 159 is a battery.

Figure 7C:
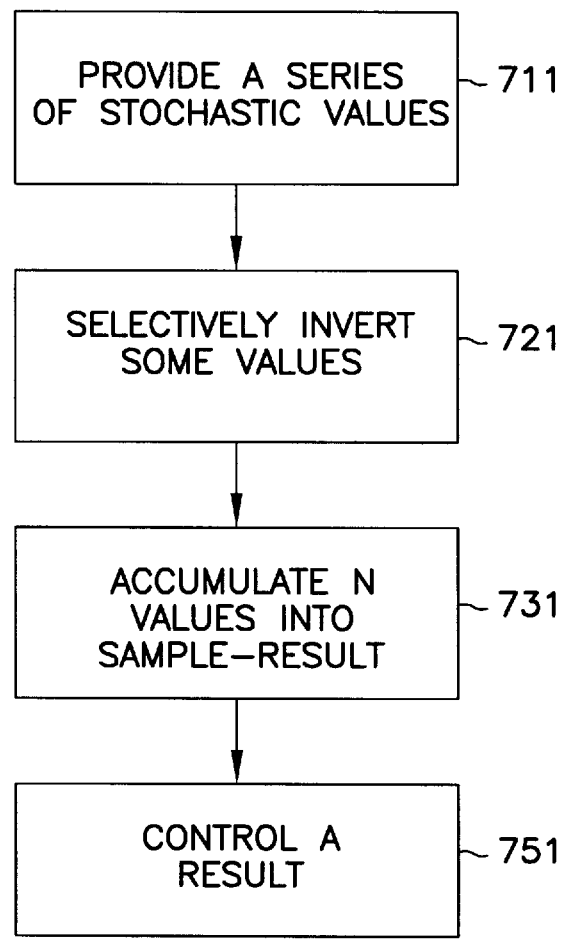
FIG. 7C is a flow diagram of one embodiment of chance-expectation-detector apparatus 700.

FIG. 7C is a flow diagram of one embodiment of chance-expectation-detector apparatus 700. At block 711, a series of stochastic values (values having a random component, such as the measured noise of physical process) is provided. At block 721, some of the values are inverted, as described above in the description for FIG. 2 and 3. At block 731, a predetermined number of values are accumulated into a SAMPLE_RESULT, whereby an expected mean and expected deviation of the SAMPLE_RESULT can be calculated or empirically determined and compared to the measured SAMPLE_RESULT. At block 751, a result is controlled as a result of this comparison.

Figure 8A:
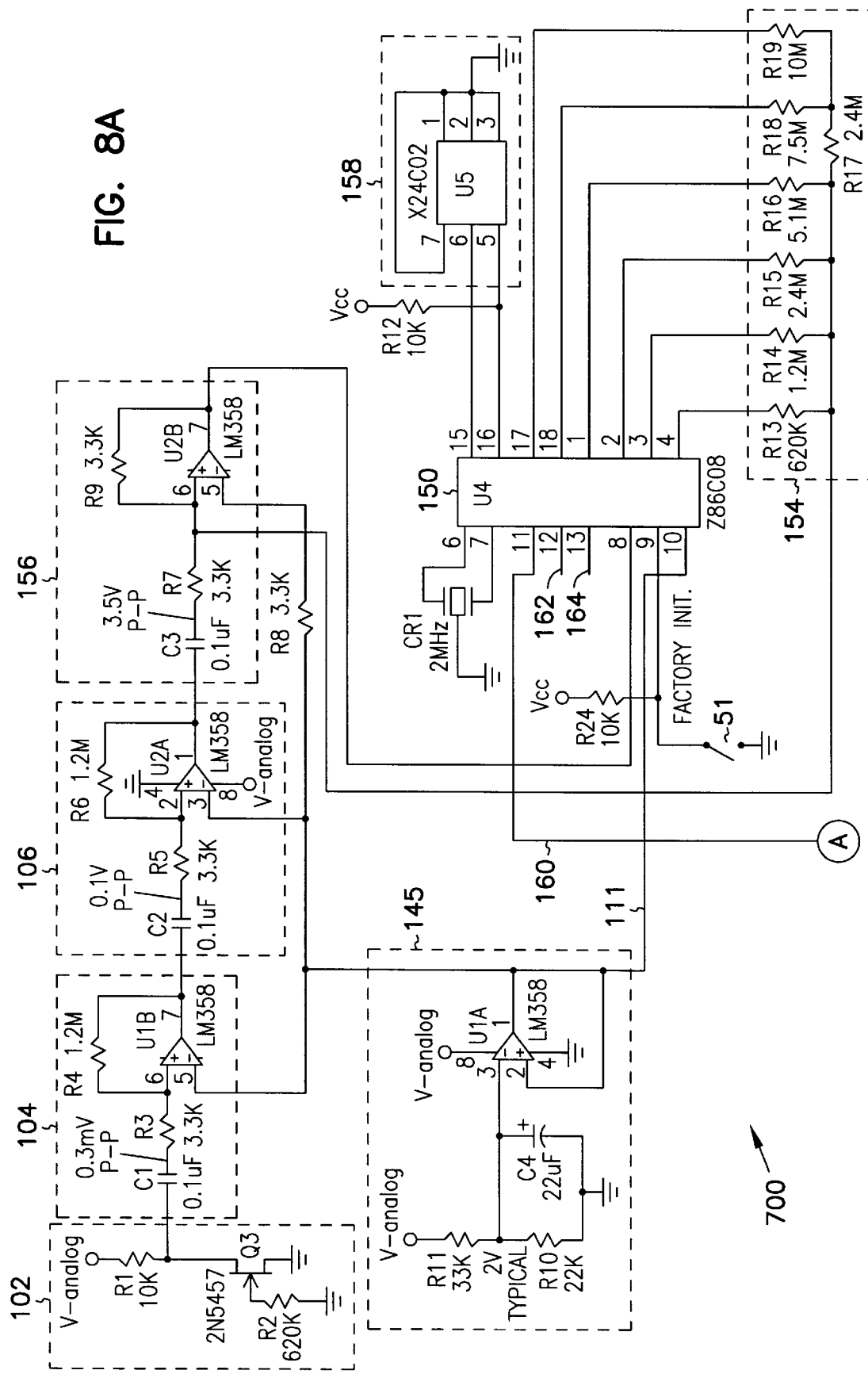
FIG. 8A and FIG. 8B is a schematic of one embodiment of chance-expectation-detector apparatus 700.
Figure 8B:
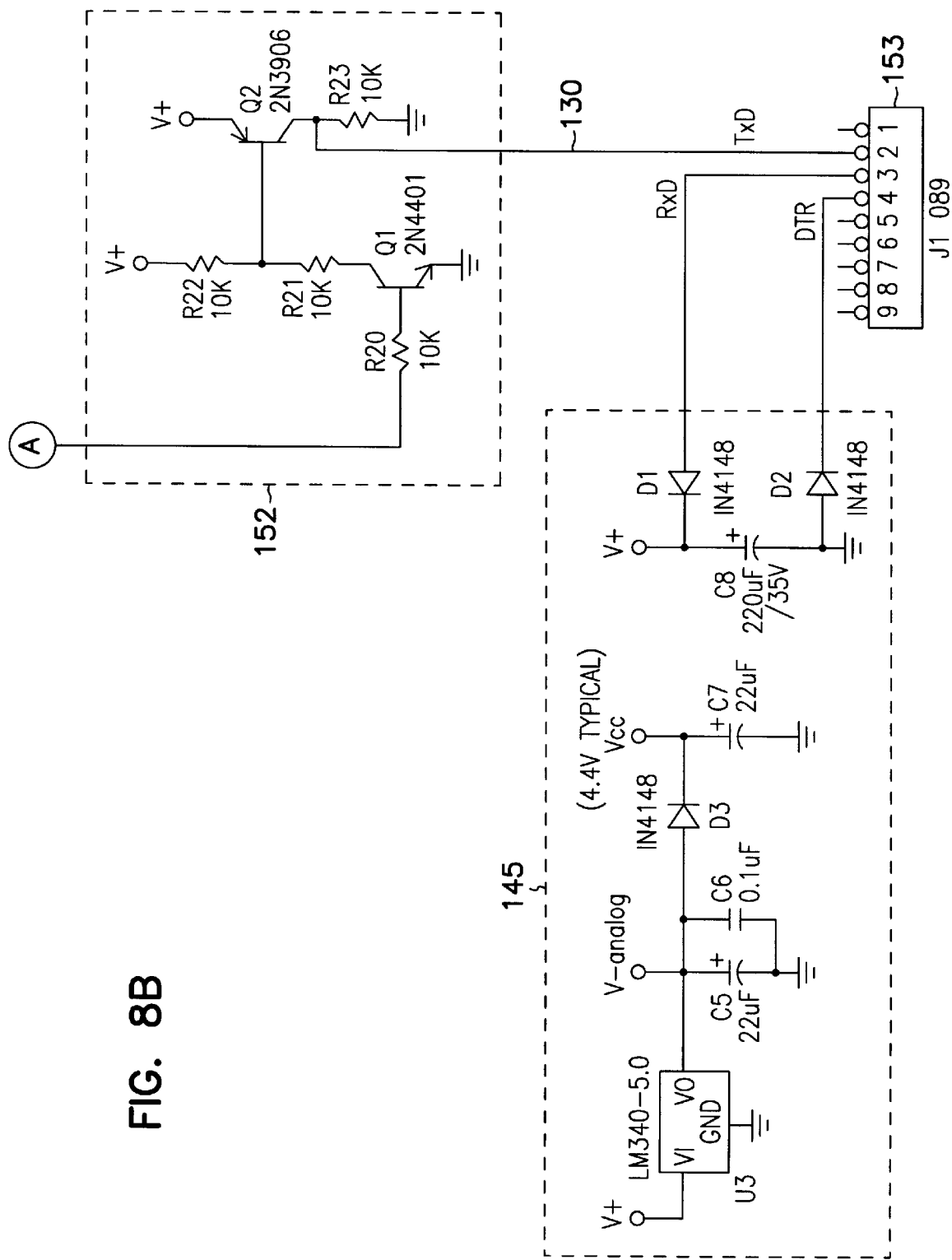

FIG. 8A and FIG. 8B (which together form FIG. 8) show a circuit diagram for one embodiment of the chance-expectation-detector 700 shown in FIG. 7B. In the embodiment shown in FIG. 8 noise source 102 includes noise resistor R2, a 620 K ohm resistor, coupled to transistor Q3, a JFET type 2N5457, load resistor R1, a 10K ohm resistor coupled to the drain of Q3. The output node of noise source 102 is coupled through DC blocking capacitor C1, a 0.1 microfarad capacitor and resistor R3, a 3.3 K ohm resistor, to amplifier U1B, one-half of an LM358 dual op amp. Resistor R4, a 1.2 megohm resistor, in combination with R3, a 3.3 K ohm resistor, and U1B provide a nominal gain of approximately 350 for amplifier 104 which in this embodiment includes C1, R3, R4 and U1B. A similar amplifier stage 106 comprises C1, R5, R6 and U2A, also providing a nominal gain of approximately 350. Amplifier stage 156 which comprises C3, R7, R9 and U2B provides a unity gain.

Voltage reference 145 includes resistor divider R11 and R10 which provide a nominal 2- volt voltage reference and unity gain amplifier U1A, which is one-half of an LM358 dual op amp. Voltage reference 145 provides a nominal 2 volt voltage reference 111 which is fed to three amplifier stages 104, 106 and 156, as well as to microprocessor 150.

In the embodiment shown in FIG. 8, microprocessor 150 is an analog/digital microprocessor (type Z86C08) having both analog and digital inputs and digital outputs, and integrated program storage. Microprocessor 150 is driven by crystal CR1, in one embodiment 2 MHz crystal. In one embodiment, a factory initialization mode is provided by R24, a 10 K ohm resistor, normally connected to Vcc, providing a high input on pin 9 of microprocessor 150. In factory initialization mode, factory init switch S1 is used to temporarily connect to pin 9 to ground indicating factory initialization mode. In one embodiment, six of the digital outputs of microcomputer 150, i.e., pins P22–P27 are used to drive resistor network 154 in order to generate an offset current which is fed back to the input node of amplifier 156. The offset current generated by resistor network 154 is used to provide an offset current which balances the net offset current of the amplifier chain and of the noise source 102. In one embodiment, during factory initialization mode, resistor network 154 is driven in a successive approximation mode in order to determine an optimal offset current to be used with chanceexpectation-detector 700. In the embodiment shown, digital outputs P00, P01 and P02 are used to output the control and data signals 160, 162 and 164.

In the embodiment shown, digital output 160 provides a serial bit stream to RS232 driver 152. RS232 driver 152 comprises resistor R20, a 10 K ohm resistor, driving transistor Q1, a NPN-type 2N4401 transistor, having a series load resistor comprising R22 and R21, each 10 K ohms. The voltage at the node between R22 and R21 drives transistor Q2, a PNP-type 2N3906 transistor and load resistor R23, a 10 K ohm resistor, to generate output signal TxD 130 which is connected to DB9 connector 153.

In one embodiment, power supply 145 drives a voltage V+ from diodes D1 and D2 capacitor C8. V+, in turn, is used to drive voltage regulator U3 which provides V-analog at approximately 5 volts. V-analog dropped through diode D3 provides Vcc at approximately 4.4 volts typically.

In one embodiment, EEPROM 158 is provided by U5, a type X24C02 8-pin integrated circuit. EEPROM 158 is used to store parameters used by microprocessor 150 during operation, such as the value needed to generate the proper offset current for the noise source.

In the embodiment shown, chance-expectation-detector 700 includes an F-REG 100 merged with microcomputer 150. The F-REG 100 includes noise source 102, amplifier strings 104, 106 and 156 (each of which contains components which contribute more-or-less to the noise signal sampled by microcomputer 150), plus internal logic and program control running in microprocessor 150. In one embodiment, game control program 550, as shown in FIG. 5, runs in microprocessor 150 as shown in FIG. 8. In one embodiment, game analysis routine 570 and game speed/difficulty control 560, as shown in FIG. 5, also run in microprocessor 150 as shown in FIG. 8.

Figure 9:
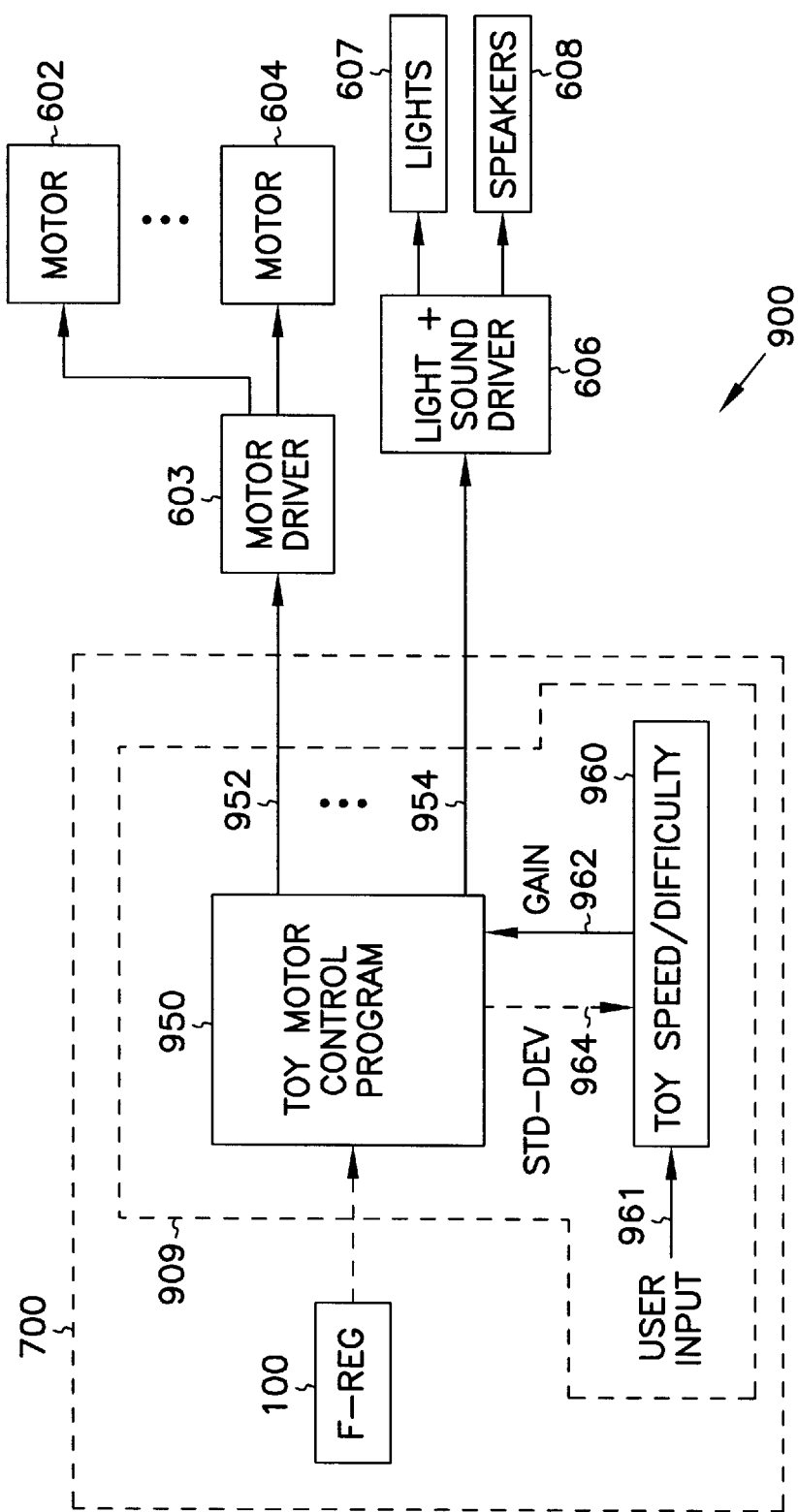
FIG. 9 is a block diagram and flow diagram of one embodiment of toy-control software 900 that uses output 130 of field-random-event generator 100 and generates motor-driver control signal 952.

FIG. 9 is a block diagram and flow diagram of one embodiment of toy 900 including toy control software 909. It uses output 130 of field random event generator 100 and generates motor driver control signal 952. In one embodiment, F-REG 100 and toy control program 909 are implemented in chance-expectation-detector 700 as shown in FIG. 8. In one embodiment, toy speed/difficulty controller 960 takes user input 961 as to the speed and/or difficulty game parameters and inputs these to toy-motor-control program 950. In one embodiment, the gain 962 is set at a value which provides a toy speed that maintains the interest of the user. In one embodiment, the standard deviation 964 of the values generated by F-REG 100 provides feedback to the toy speed/difficulty controller 960 and is used to adaptively adjust gain 962 to maintain the interest of the user. In other embodiments, other attributes, such as statistical-significance trends or histories of the values from F-REG 100, are used to adjust gain 962. The motor control 952 from toy motor control program 950 is coupled to motor driver 603 which provides a control signal to motors 602 and 604. In one embodiment, the motors are used to control the forward and reverse direction, the speed and the left/right direction of a toy car 600, such as shown in FIG. 6. In other embodiments, control signals 952–954 from toy motor control program 950 are also coupled to light-and-sound driver 606 which provides control signals to lights 607 and speakers 608. In one embodiment, the lights and sounds are controlled to indicate the magnitude of the statistical significance of the values generated by F-REG 100. In one such embodiment, the sounds generated include engine noises and rumbling, horns, and traffics noise.

In another embodiment as shown in FIG. 16, motors 602 and 604 are used to control the movement of a toy cat and controls the leg motion and head motion of the toy cat 1600. In this embodiment, control signals 952–954 from toy motor control program 950 are also coupled to light-and-sound driver 606 which provides control signals to lights 607 (used in the eyes of the cat) and speakers 608. In one such embodiment, the sounds generated include cat meows, purring, and/or hissing.

Figure 10:
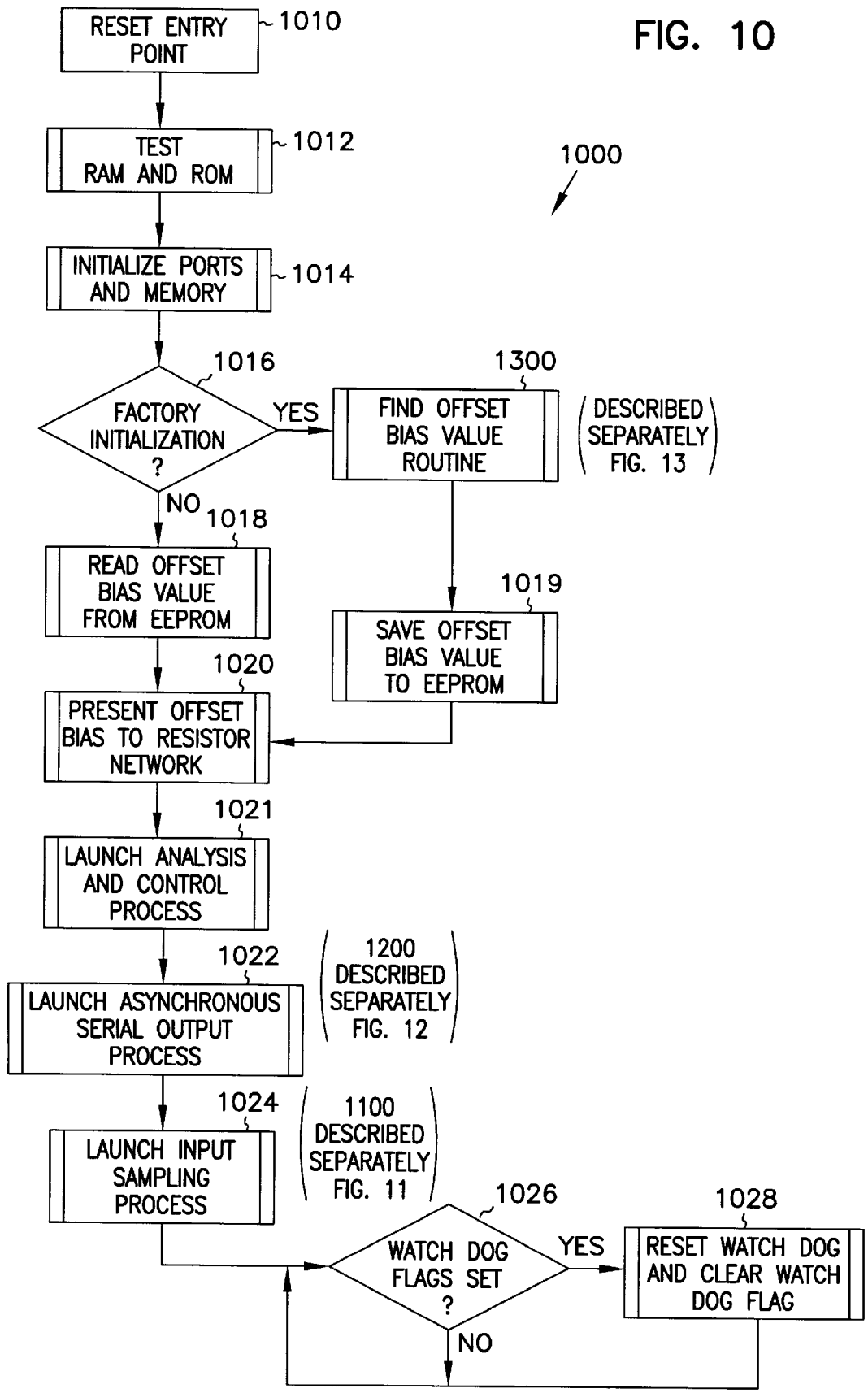
FIG. 10 is a flow diagram of one embodiment of software 1000 that runs in microcomputer 150.

FIG. 10 is a flow diagram of one embodiment of software 1000 that runs in microcomputer 150 of chance-expectation-detector 700. As shown in FIG. 10, the software starts at reset entry point 1010. The flow then passes to test RAM-and-ROM block 1012 and then to initialize-ports-and-memory block 1014, which together initialize the microprocessor 150. The flow is then passed to decision block 1016 in which the factory initialization bit is tested. If factory initialization is to be performed, control passes to block 1300. Block 1300 is a routine used to find the offset bias value by successive approximation and is further described below in FIG. 13. After block 1300 is executed, control passes to block 1019 in which the offset bias determined by block 1300 is saved to EEPROM 158. If factory initialization is not detected at decision block 1016, control passes to block 1018 in which the offset bias value saved earlier in EEPROM 158 is read. At block 1020, the offset bias determine from the saved offset-bias value is presented to resistor network 154. Control then passes to block 1021 which launches analysis-and-control process 1400 (once launched, these routines 1400, 1200, and 1100 are called by subroutine calls, timers, and/or interrupts). Control then passes to block 1022 which launches asynchronous-serial-output process 1200. Control then passes to block 1024 which launches input-sampling process 1100. Control then passes to watchdog blocks 1026 and 1028. The function of watchdog blocks 1026 and 1028 is to determine whether or not code is properly running in microprocessor 150. If a watchdog timer expires due to code not properly running, control is then passed back to reset entry point 1010, by which control over the program is regained. As long as code is properly running in microprocessor 150, the watchdog timers are periodically reset (or set) by the normal code and the watchdog timers will not expire.

Figure 11:
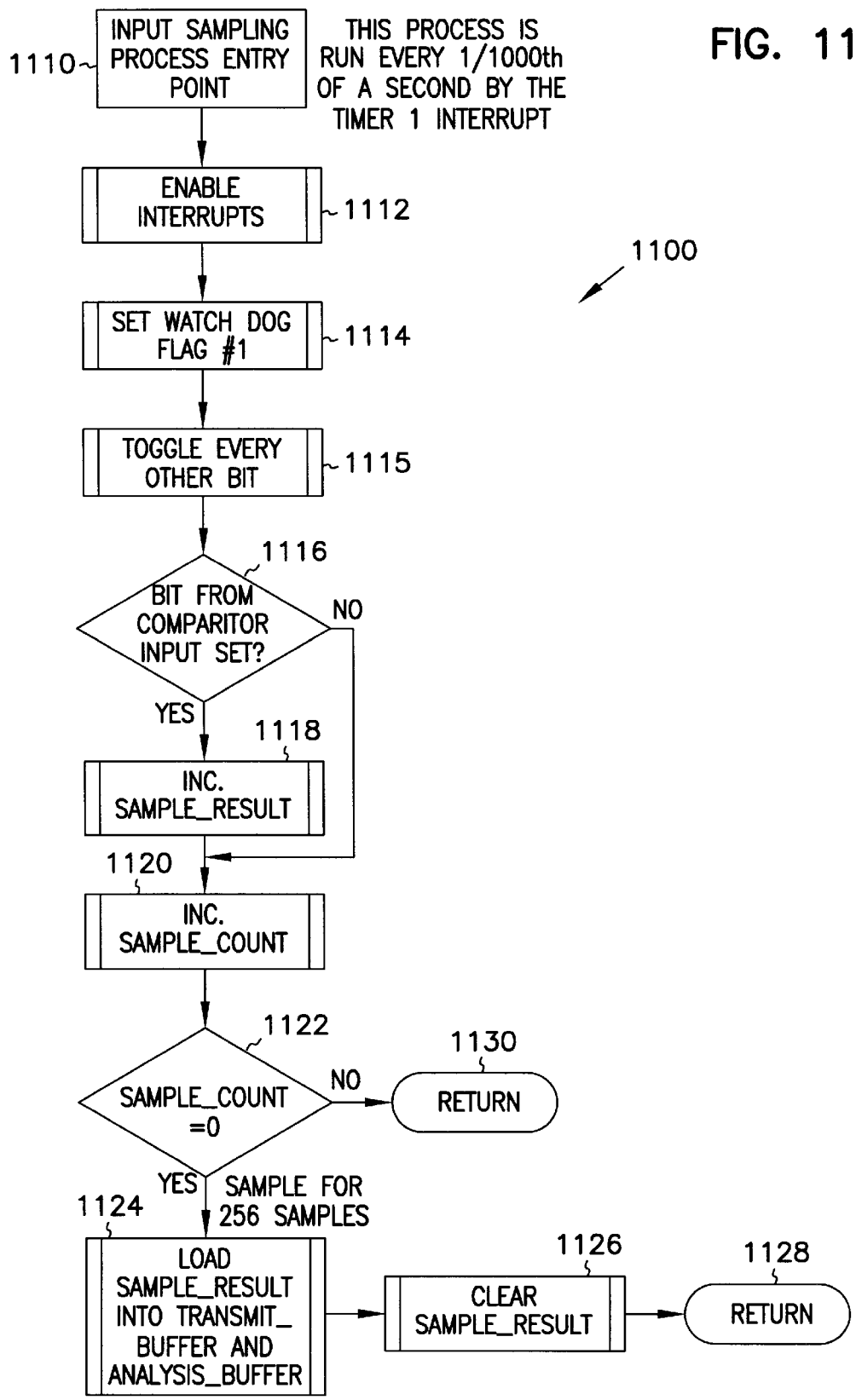
FIG. 11 is a flow diagram of one embodiment of input-sampling process 1100 that runs in microcomputer 150.

FIG. 11 is a flow diagram of one embodiment of input sampling process 1100 that runs in microcomputer 150. Input sampling process 1100 is run on a timer-1 interrupt which, in one embodiment, is set to run this routine every one millisecond by the timer 1 interrupt. When the timer 1 interrupt is recognized, control is passed to input sampling process entry point 1110. Control then passes to block 1112 which enables interrupts. Control then passes to block 1114 which sets watchdog flag number 1, (keeping it from expiring) thus showing the code is properly running through this routine. Control then passes to template block 1115 which, in one embodiment, toggles every other bit input from amplifier 156 to microcomputer 150, thus producing an alternated bit stream wherein every other bit from the noise source is toggled (in order to prevent first-order drift from overly biasing the results). In another such embodiment, template block 1115 exclusive-ORs the sequence of bits 117 with a pseudo-random template series of ones and zeros (e.g., a predetermined stored sequence of numbers having known statistical parameters such as 50% zeros and 50% ones such as pseudo-random sequence mask 299 shown in FIG. 3) so that bits of bit sequence 117 are toggled according to the template series. Control then passes to decision block 1116 where the alternated bit stream, i.e., the bit from the comparator as alternated by the toggling process of block 1115, is tested. If the sampled bit is a one, control passes to block 1118 which increments the SAMPLE_RESULT. Otherwise, control bypasses block 1118, thus not incrementing SAMPLE_RESULT if a zero bit is detected. This accumulation of binary bits in SAMPLE_RESULT is called "variance accumulation," and SAMPLE_RESULT is a "variance accumulator."

Control then passes to block 1120 which increments the total SAMPLE_COUNT. Thus, at this point, SAMPLE_RESULT contains a count of the number of one bits and SAMPLE_COUNT contains a count of the total number of bits, and ratio of sample result to sample count shows the proportion of one bits to total bits. Control then passes to decision block 1122 which tests sample count to see if it has overflowed to a zero value. The sample count counts from 0 to 255. When it overflows to 256, it then contains a zero value which is detected by decision block 1122. While the sample is being accumulated, sample count will have a non-zero value at the decision block 1122 and control passes to the return operation at block 1130. When the sample count indicates that 256 samples have been accumulated, control passes to block 1124 where the value of SAMPLE_RESULT is loaded into the transmit buffer and into the analysis buffer. At this point, SAMPLE_RESULT has a range between 0 and 255, a mean value of approximately 128 and a standard deviation of approximately eight. In another embodiment, 1024 bits are counted to generate a SAMPLE_RESULT output number having an expected mean of 512 and standard deviation of 16. One such embodiment then subtracts 512 from such a count to generate a SAMPLE_RESULT output number having an expected mean of zero and standard deviation of 16. In another such embodiment, the process 1100 involves counting eight bits, subtracting four from the result, and adding the result to the accumulated total, until 128 groups of eight bits are counted, with four subtracted from each group's result before adding that result to the total (thus keeping the SAMPLE_RESULT mean approximately zero during the accumulation). Since overflow or underflow occurs at approximately eight standard deviations from the mean value, there is only a very small chance that the result will need to be truncated to −128 or +127 as described above. Control then passes to block 1126 which zeros the SAMPLE_RESULT variance accumulator. Control then passes to return block 1128.

Figure 12:
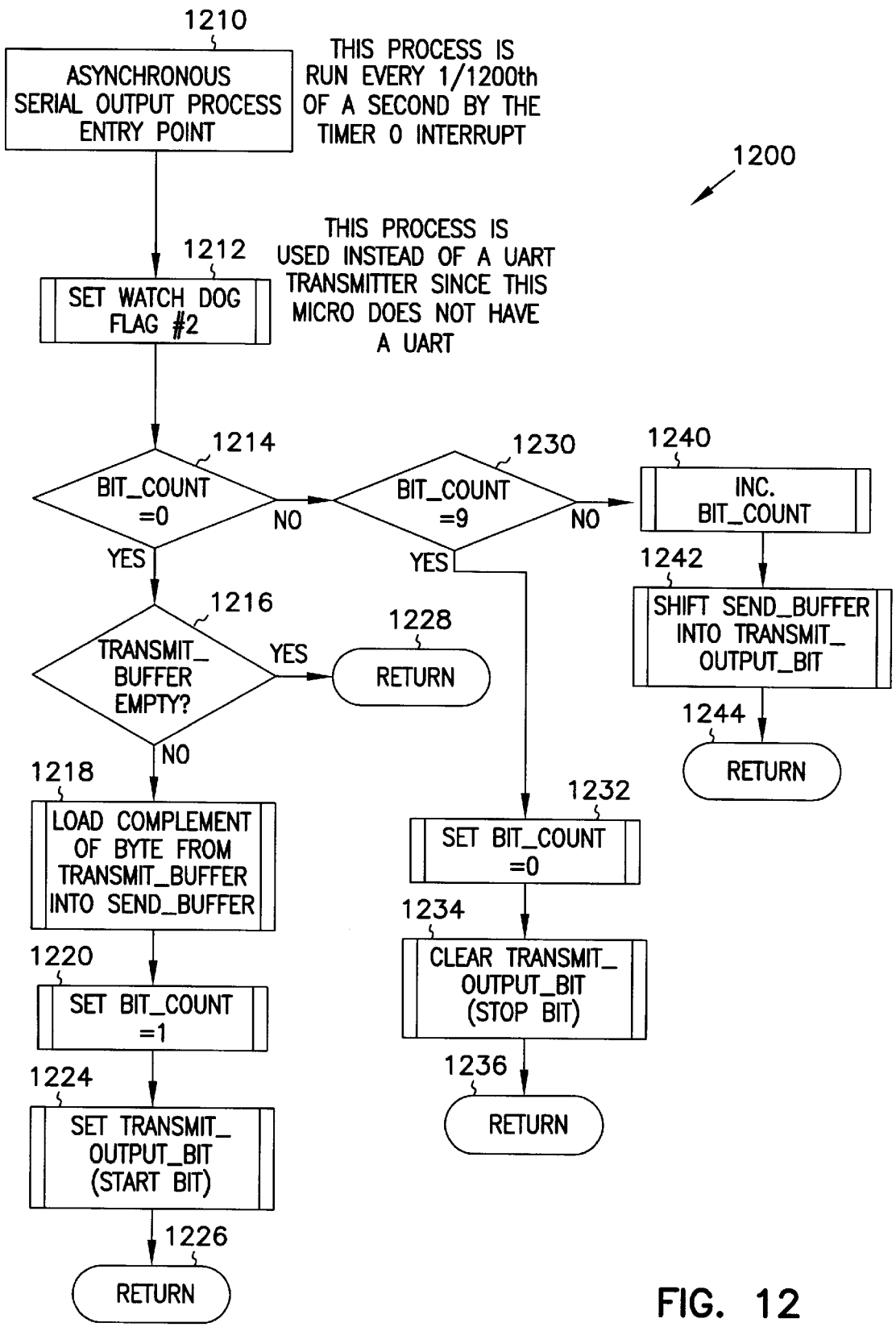
FIG. 12 is a flow diagram of one embodiment of asynchronous-serial-output process 1200 that runs in microcomputer 150.

FIG. 12 is a flow diagram of one embodiment of asynchronous-serial-output process 1200 that runs in microcomputer 150. The overall function of asynchronous-serial-output process 1200 is to serially shift one bit at a time of the transmit buffer value into the output signal 130. Asynchronous-serial-output process 1200 is initially launched by block 1022 in FIG. 10. This process is run on an interrupt driven by timer 0 interrupt which occurs approximately every ¹⁄₁₂₀₀th of a second. This process is used to drive an RS232 signal at approximately 1200 baud. The entry point of asynchronous-serial-output process 1200 is at block 1210. Control then passes to block 1212 which sets watchdog flag number 2, thus preventing a watchdog time out for this section of code. Control then passes to decision block 1214 which tests whether bit count is equal to zero. Bit count keeps track of how many of the 8 data bits of the transmit buffer have been transmitted. If, at block 1214, bit count is equal to zero, control passes to decision block 1216 which tests whether transmit buffer is empty. If at block 1216 the transmit buffer is empty indicating that no data is to be sent, control passes to block 1228 and a return is performed. If at decision block 1216 the transmit buffer is not empty, this indicates that the full data byte is to be transmitted and control passes to block 1218 which loads a complement of the byte from the transmit buffer into the send buffer. Control then passes to block 1220 which sets bit count equal to one. Control then passes to block 1224 which sets transmit_output_bit to one which is start bit and control passes to return 1226. If at decision block 1214 the bit count is not equal to zero, control passes to decision block 1230 which tests whether the bit count is equal to 9. If the bit count is equal to 9, control passes to block 1232 which sets the bit count back to zero. Control passes then to block 1234 which clears the transmit_output_bit which effectively sets the stop bit and control passes to return 1236. If at decision block 1230 the bit count is not equal to 9, control passes to block 1240 which increments the bit count and passes control to block 1242 which shifts the send buffer into the transmit output bit and control passes to return 1244.

Figure 13:
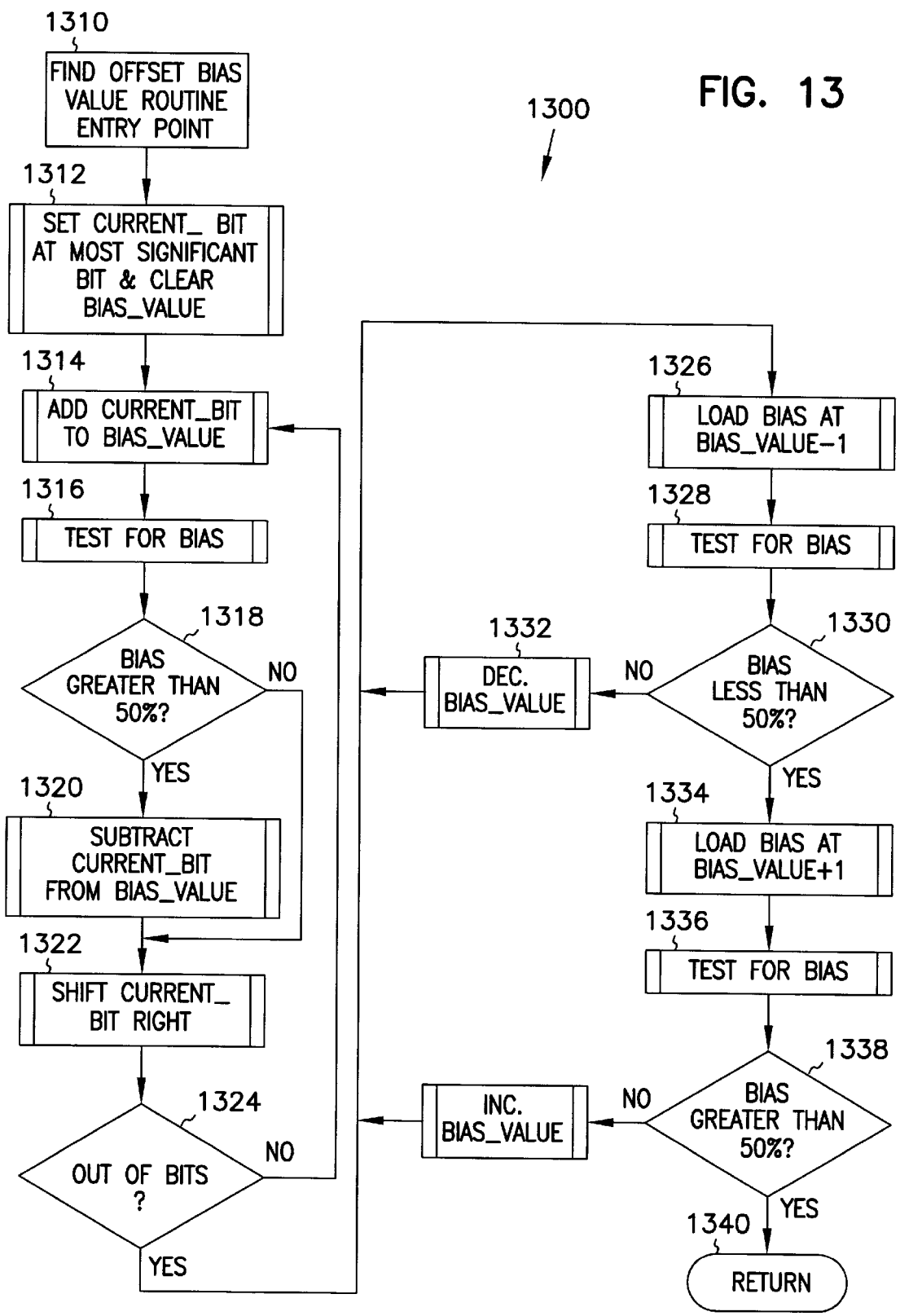
FIG. 13 is a flow diagram of one embodiment of offset-bias-calibration routine 1300 that runs in microcomputer 150.

FIG. 13 is a flow diagram of one embodiment of offset-bias-calibration routine 1300 that runs on microcomputer 150. Offset bias calibration routine 1300 is called from FIG. 10 during factory initialization, in order to calibrate F-REG 100 to produce as close as possible to 50% ones and 50% zeros. From entry point 1310, control passes to block 1312 which sets the routine to start at the most-significant bit, and clears the BIAS_VALUE. At block 1314, the current bit (the routine starts with the most significant bit) is added to the BIAS_VALUE. At block 1316, a string of values from the F-REG 100 section is tested, looking for an ideal of 50% of the binary bits set to one, and the other 50% set to zero. At decision block 1318, a test of greater than 50% is performed, and if yes, the CURRENT_BIT is subtracted from BIAS_VALUE. Control then passes to block 1322, where the CURRENT_BIT is shifted right one (divided by two). Block 1324 tests whether all bits have been tested, and if not, control passes back to block 1314, and if yes, control passes to block 1326. Block 1326 loads the bias at BIAS_VALUE −1, and block 1328 again determines the bias. Decision block 1330 tests for bias <50%, and if not , passes control to block 1332 which decrements BIAS_VALUE and branches to block 1326. If block 1330 determines bias <50%, control passes to block 1334 which loads bias at BIAS_VALUE+1, and block 1336 again determines for bias. Decision block 1338 then tests for bias >50%, and if so, the routine 1300 ends at return block 1340, and if not, BIAS_VALUE is incremented and control returns to block 1326.

Figure 14:
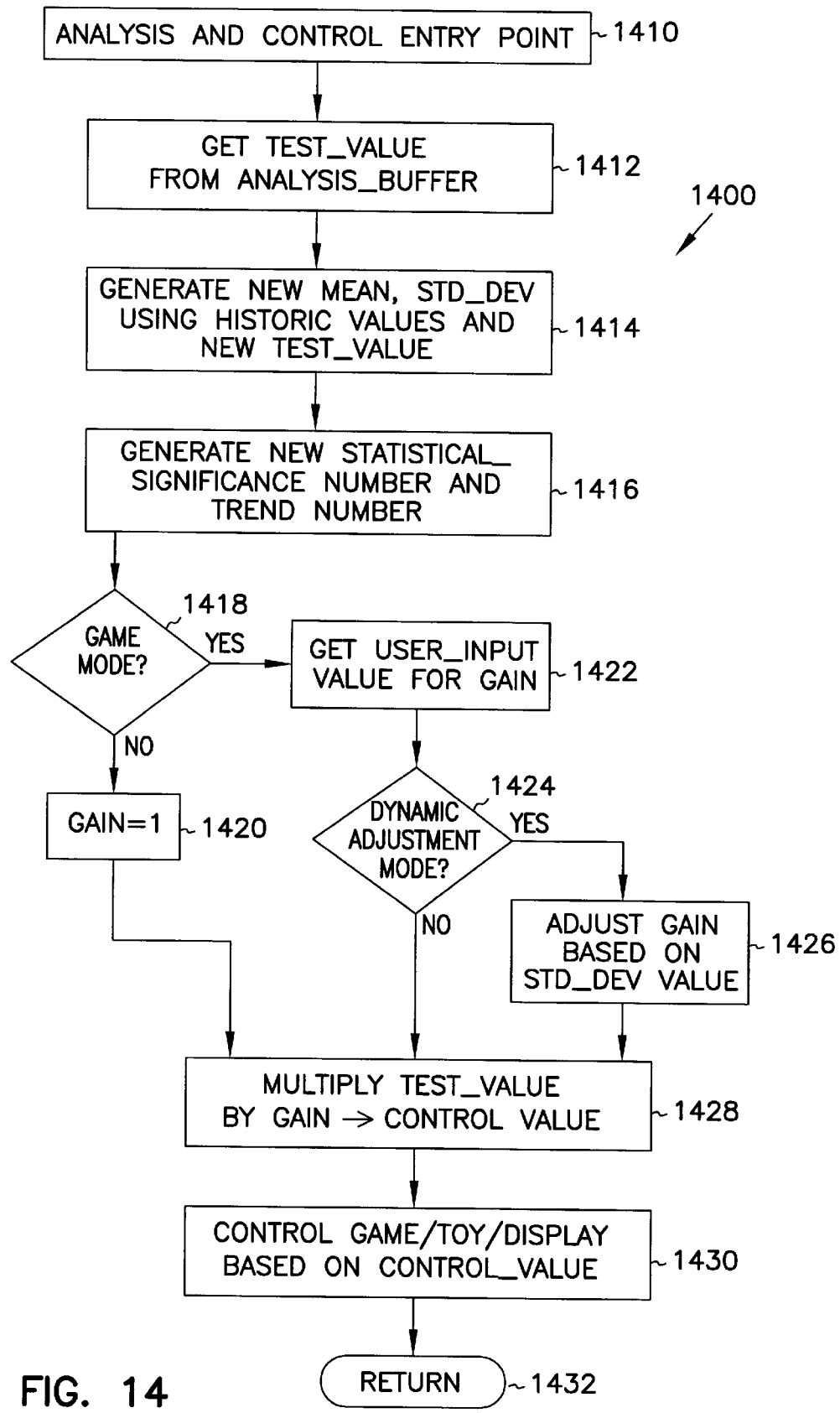
FIG. 14 is a flow diagram of one embodiment of analysis-and-control process 1400 that runs in microcomputer 150.

FIG. 14 is a flow diagram of one embodiment of analysis-and-control routine 1400 that runs on microcomputer 150. Offset bias calibration routine 1400 is launched from block 1021 of FIG. 10. Entry point 1410 is called each time a test value (e.g., a random number between 0 and 255 inclusive) is generated by F-REG 100 (e.g., from block 1124 of FIG. 11). Control then passes to block 1412 which gets a TEST_VALUE from ANALYSIS_BUFFER. At block 1414, this new TEST_VALUE is combined with previously obtained values to generate an updated MEAN and standard deviation (STD_DEV). At block 1416, a statistical significance number and a trend number are generated representing how probable this number is and/or the series of numbers is. At block 1418, a test is made to determine whether the device is in game mode. If not, the gain is kept at one (block 1420). If so, the gain is adjusted to keep the game "interesting." Block 1422 gets user input (or preset "factory value") for the gain. If dynamic-adjustment mode is determined at block 1424, block 1426 adjusts the gain based on the current pattern of values from F-REG 100 (e.g., as determined by STD_DEV). Control then passes to block 1428, which multiplies the input random number (TEST_VALUE) by the gain, to generate the CONTROL_VALUE used by chance-expectation-detector 700 to control the visual, audio, and/or mechanical outputs of the system at block 1430. The routine then returns at block 1432.

Figure 15A:
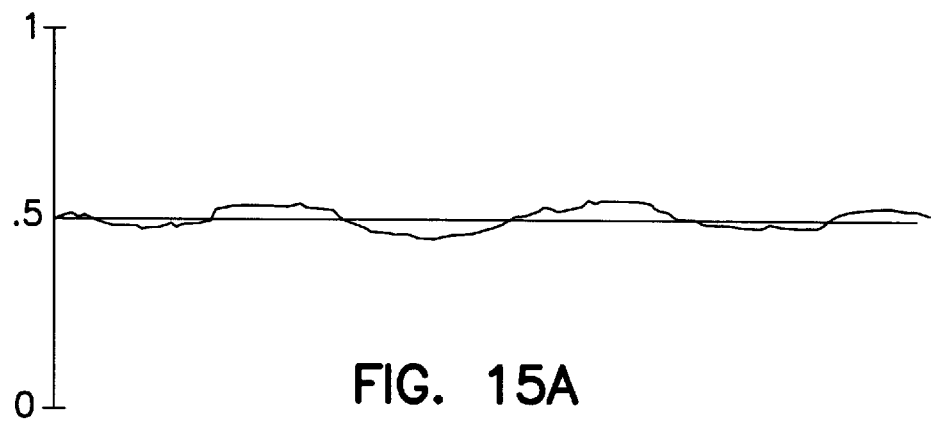
FIG. 15A is a graph showing an accumulated output of F-REG 100 having a relatively small standard deviation.
Figure 15B:
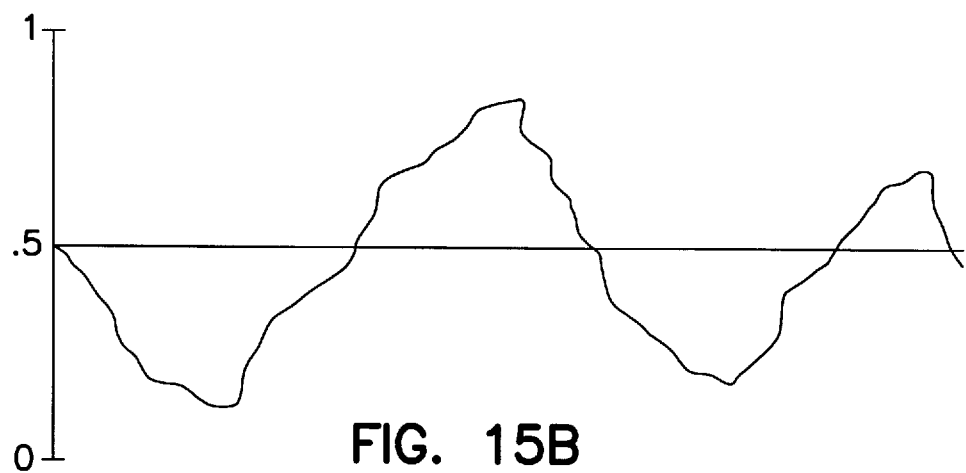
FIG. 15B is a graph showing an accumulated output of F-REG 100 having a relatively large standard deviation.

FIG. 15A is a graph showing an output of F-REG 100 having a relatively small standard deviation. FIG. 15B is a graph showing an output of F-REG 100 having a relatively large standard deviation. As described above, when used to control a game, the gain for a curve such as FIG. 15A would be increased, and the gain for a curve such as FIG. 15B would be decreased, in order to provide optimal reinforcing effect from the visual, audio, or mechanical devices controlled by chance-expectation-detector 700.

Figure 15C:
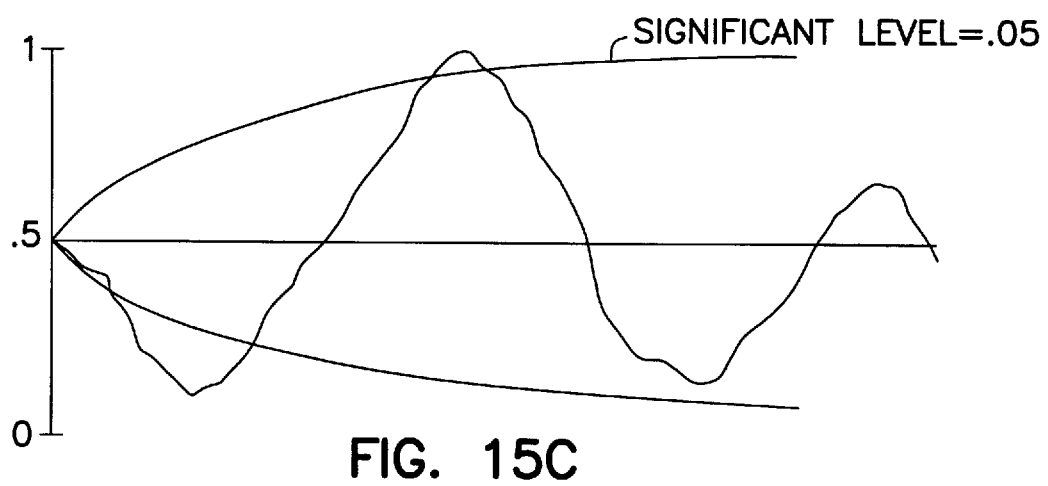
FIG. 15C is a graph showing an accumulated output-of F-REG 100 having a relatively large standard deviation, also showing a parabola where the significance level is e.g., 0.05, with 2 excursions beyond this level.

FIG. 15C is a graph showing an output of F-REG 100 having a relatively large standard deviation, also showing a parabola where the significance level is e.g., 0.05, with 2 excursions beyond this level.

Computer software

Figure 17:
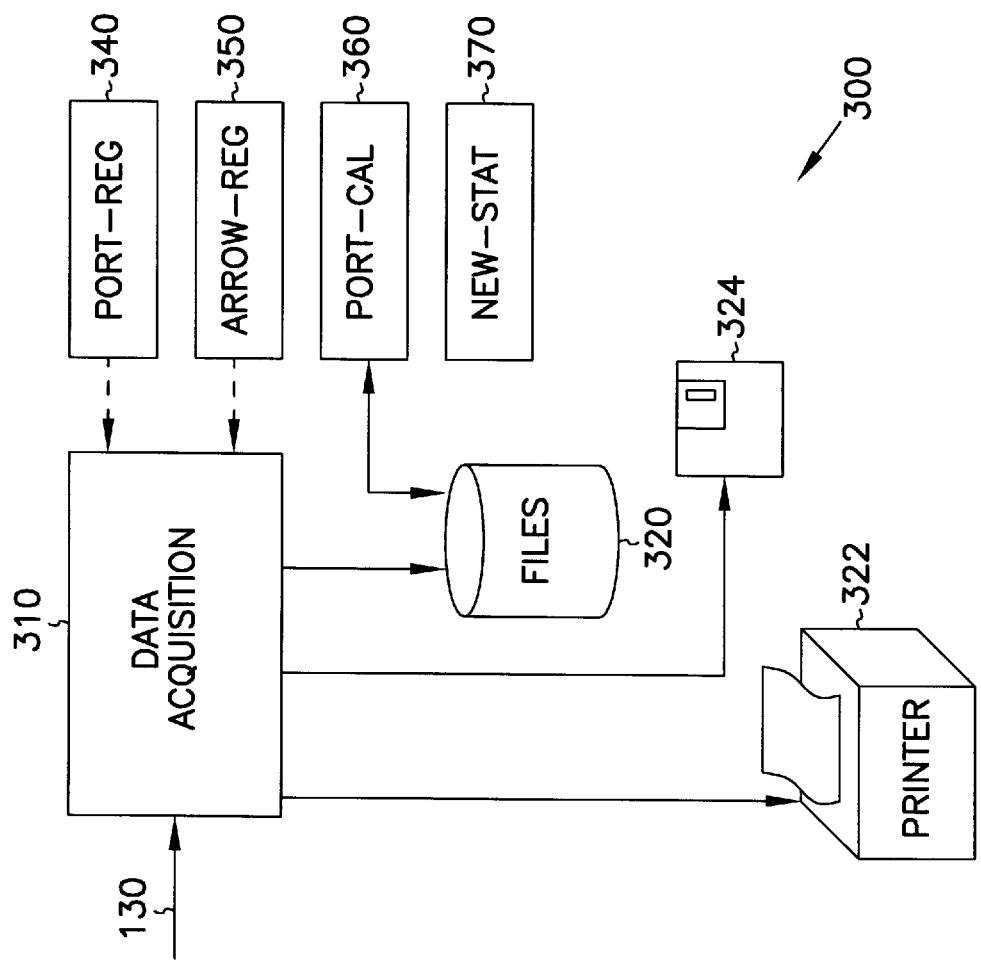
FIG. 17 is a block diagram and flow diagram of one embodiment of software 300 that uses output 130 of field-random-event generator 100.

In one embodiment, software package 300, shown in FIG. 17, runs on computer 99 and includes data acquisition 310 and statistical analysis 330 programs distributed on either a 5.25" or 3.5" high density floppy disk, formatted for 1.2 or 1.44 MB, respectively. Computer 99 has an Intel 80286 or more recent processor (AT, 386, 486, or Pentium™), and has an RS-232 serial communication port and a printer port. The processor is 100% Intel-compatible, and runs PC-DOS, MS-DOS or an equivalent operating system. At least 640 KB of memory should be available, as well as a hard disk for data storage. Section 5 provides detailed instructions for installation of the software.

For data acquisition 310, the software 300 reads the first serial port (COM1) connected to serial-out signal 130, and assembles 25 sequential bytes (of 8 bytes each) into a 200-bit trial, which is recorded as a sum of bits with expectation 100, variance 50. The trials are accumulated in runs of 50, 100, or 1000, and these sequences of trial values are written to DOS files 320. In one embodiment, for security and redundancy, a continuous hardcopy is also printed on printer 322, that in one embodiment is an IBM Proprinter-compatible dotmatrix printer. In another embodiment of the software 300, a concurrent backup is made on a floppy disk 324.

Figure 18:
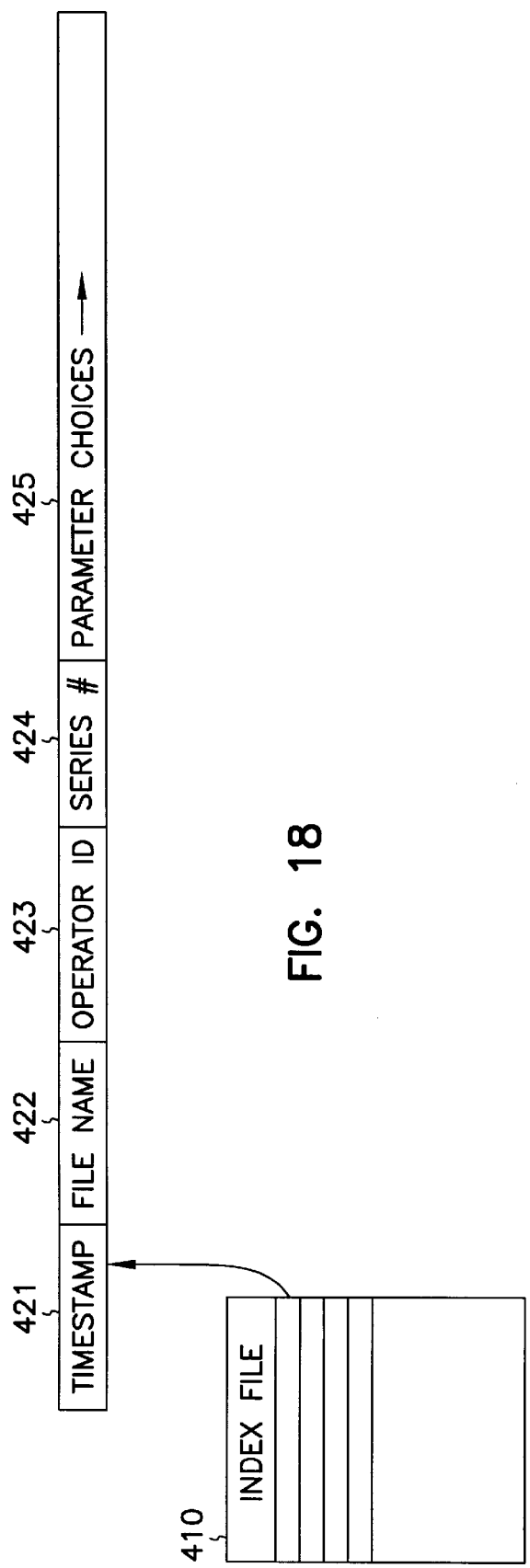
FIG. 18 is a data-structure diagram of one embodiment of an index file 410 used to hold data for software 300.

Experiments are managed and recorded using the program named PORTREG 340, which allows several options for runlength, feedback, and other secondary parameters. It is described more fully in the program documentation, Section 6. A variant of the program called ARROWREG 350, designed for a specific experimental project, is documented in Section 8. Calibrations are accumulated using the PORT-CAL 360 program, which automatically records and indexes a continuing sequence of one-thousand (1000)-trial runs of about 14 minutes duration, separated by an interval of about one minute. These programs all process and record data in much the same way, each producing a single index file 410 as shown in FIG. 18 that includes the time-stamped parameters associated with each data file as they accumulate in a given subdirectory. The index file 410 includes an index line 420 for each separate run of data, and records the file number 422, operator identification 423, series number 424, and all parameter choices 425, in addition to the date and time 421 of the run. For PORTREG there is, for each experimental series, either one, 10, or 20 index lines 420 per intention, corresponding to series using 1000-, 100-, and 50-trial runs, respectively. For ARROWREG 350, although the data are taken in 100-trial blocks, they are recorded in files as 1000-trial runs, and the index file accordingly contains only one index line 420 per intention. (See Section 8 for further detail.) PORTREG.EXE, ARROWREG.EXE and PORTCAL.EXE are the executable programs and should be installed in a convenient subdirectory on the DOS path.

The NEWSTAT 370 program reads data files according to specifications set using a menu interface, and generates statistical analyses and graphic displays of the selected data subset. An auxiliary program named NEWSTAT.INF must be installed in the root directory on the C: drive, while the C-language executable program NEWSTAT.EXE may be installed in a convenient subdirectory that is specified in the DOS path. More detailed description of this program is included in Section 9.

Utilities such as STRIP.EXE, DECOMP.EXE, MAKETEXT.EXE, and READFILE.EXE should also be installed in this subdirectory; these are needed for convenient analysis of ARROWREG 350 and calibration data, and are further described in Sections 8.4 and 9.

4. Calibrations

In one embodiment, each field-random-event generator 100 is subjected to extensive qualification and calibration tests, including a full-scale calibration regime such as used for the original PEAR device. The overall performance conforms generally to chance expectations for the theoretical binomial distribution, with mean, variance, skew, and kurtosis parameter estimates distributed according to chance expectations in repeated tests. In particular, the distribution mean, which is the "target" in the standard REG experiment, is statistically indistinguishable from the theoretical expectation in repeated calibrations. Before shipping, a calibration set of 100,000 trials is generated for each field-random-event generator F-REG 100, and the statistical summary of these trials is included as part of the device documentation. While the "tripolar protocol" of the formal experiment (three intentions: to generate high counts, low counts, or baseline data) provides adequate artifact control, regular calibration using the PORTCAL 360 program to generate datasets of a size and configuration commensurate with experimental databases is desirable to document nominal system performance in the local operating environment. The NEWSTAT 370 program, described in Section 9, can be used to assess calibration data in sets of any size up to approximately 168,000 trials, given the standard 640 K of memory and the default startup parameters.

5. Example computer setup

In the example below, commands and filenames are shown in quotes and capital letters for emphasis only. They may be typed in either uppercase or lowercase; the quotes should not be included. Experienced DOS users may prefer a different setup from that suggested; however, NEWSTAT-.INF must be in the root directory, and for convenience, the use of a path reference to a single copy of the executable files is recommended.

1. Enter the root directory C:.
2. Copy NEWSTAT.INF to the C: root directory: "COPY A:NEWSTAT.INF C:\"
3. Create a subdirectory for executable files: "MKDIR BIN"
4. Copy executables: "COPY A: *.EXE C:\BIN"
5. Add BIN to the path by editing the path command in the AUTOEXEC.BAT file. If no path command exists insert "PATH C:\BIN" in the autoexec.
6. Create a subdirectory for the experiment: "MKDIR REG"
7. Within REG, create subdirectories for each individual: "CD REG" then "MKDIR NNN", where NNN is the individual's identification number.
8. To run experiments, change to the appropriate subdirectory on the hard disk, e. g., "CD\REG\NNN", and type "PORTREG".

Setup for ARROWREG 350 is similar, but requires an extra level of subdirectories. The program 300 expects by default to write files to the hard disk and the A: floppy drive. However, a command line argument may be used to direct the files to the B: drive. The program 300 also requires other files that allow special options. For details, see Section 8.

6. Using PORTREG

This program duplicates most of the functions of the standard PEAR REG experiment, but accesses a field-random-event generator 100 connected to the serial port. The documentation includes a full description of the formal protocol for both local and remote experiments, describes the optional experimental parameters, and provides complete operational instructions.

6.1. Setup

See Section 5 for a detailed example of a convenient computer file setup. Each operator should have his/her independent data subdirectory on the hard disk. The POR-TREG 340 program itself should be located somewhere on the "path", that is, it should be possible to invoke the program 300 from any drive or directory. Before running the program 300, a check should be made to ensure that there is adequate remaining disk space for storing the data; 10000 bytes will be sufficient for one complete series of 3000 trials.

PORTREG 340 is designed to use high-resolution color graphics but can run on a machine with either EGA or VGA hardware. The non-graphic modes (Digital or REG panel feedback displays) are compatible with any monitor, since both use text characters rather than true graphics.

The first time the program 300 is run from a given directory, it will create the index file it needs for bookkeeping (see section 6.4 for a fuller description.) It is at this time that the operator ID number and beginning series numbers are entered. Thereafter, it will read the existing index file and automatically determine the operator ID, the current series and file numbers, etc.

6.2. Formal protocol

The PORTREG experiment follows the "THOU" protocol adopted for the original REG, in which a series consists of 1000 200-sample trials in each of the three intentions.

The intentions are:

1. To generate High meanshifts (H), i. e., counts over 100
2. To generate Low meanshifts (L), i. e., counts under 100
3. To generate Baseline sequences (B), i. e., undisturbed distributions If at all possible, a series should be completed in one session; at a maximum it should be completed in one day. Unless there are excellent reasons for extending a series beyond one day, and this is prearranged with an experimenter, such series should be treated as incomplete and voided.

Every operator must be assigned a unique ID number, and a separate data directory. A dated logbook should be maintained in which index information and statistical summaries for each series are recorded, together with notes by the experimenter or operator documenting any special circumstances. For comparison with the online computer data files, a complete hardcopy for every formal series is made using a printer with continuous, fanfold paper; it should contain no unexplained gaps, breaks, or repeat headers. If hardcopy is missing or damaged and there are no explanatory notes in the logbook, the series should be voided.

After setting the parameters or conditions using the menu and F-keys (as explained in Section 6.4.3) the computer screen will show the index line, which may be copied as the logbook entry identifying the current series. The index line on the computer screen looks like this:

00037 078 012 I/O A A 0 G 1000/0200/01000 05/25/89 16/27

The corresponding series label in the logbook might appear as follows:

78 (12) 1/0 A A G 1000/200 5/25/89 16/27

This logbook entry identifies: Operator 78, series 12, instructed mode (I), intention to be determined (0), local protocol (A), automatic control (A), graphic feedback display (G), 1000 trials per run, 200 samples per trial, May 25, 1989 at 4:27 pm. (Some items need not be transcribed to the logbook: the file number is entered with the results, the 0 in AAOG is unused with the F-REG 100, and the sampling rate is always 1000.)

In addition to the overall series information, the logbook should also contain a record of the results for each run generated in the series. This information should include the intention of the run, the file number under which the raw data were recorded, and the mean and standard deviation as displayed at the end of the run. Additional summary information for each series should also be calculated using the NEWSTAT program, and recorded: namely the z-score in each of the three intentions, the p-value of that z-score, and any unusual or significant parameter values. These do not need to be calculated immediately, but logbook space should be provided for this information, as well as notes and comments of the operator and experimenter.

6.3. Remote protocol

Remote experiments follow substantially the same protocol as above, except that an experimenter must perform the required on-site setup, since the operator is by definition not present. As explained in Section 6.4.3 and Table 1, the mode for remote experiments is necessarily "R", the protocol is "C" (for real-time or concurrent experiments) or "D" (for off-time experiments). The choice of the "R" experimental mode, in PORTREG's initial setup, constrains the intention to "X", the feedback to "N", the auto/manual control to "A", and the number of trials per run to 1000.

A local time must be prearranged for the remote series to begin, after which the three runs that make up the series are started at twenty minute intervals. The experimenter records each run in the logbook with an intention of "X". Some time after the experiment is conducted, the remote operator either calls, faxes, or writes the lab with the intentions for the three runs. These are recorded in the logbook and added to the hardcopy before any feedback is given the operator. Subsequently, the intentions are entered in the computer index file to allow statistical processing.

6.4. Running the program 300

6.4.1. Initial phase

The program 300 starts by searching for a file named "INDEX" in the current directory. If it fails to find such a file, it prints a message to that effect and says that a new index file will be created. It then waits for an operator keypress before proceeding. Next, it requests the last previous filenumber, which defaults to 0 in the assumed instance of setting up a directory for a new operator. The program 300 then requests operator and series numbers, and after these are entered, it proceeds to step 2 (section 6.4.2.). For a new index, the series number defaults to "0" if no entry is made; normally "1" should be entered.

If "INDEX" exists and contains properly formatted data, the program 300 will find the last series recorded. It checks to see whether that series is complete; if so, it records the operator number, increments the last series number and file number by 1, and proceeds to step 2. If the last series found is incomplete, a warning message is printed; the operator is given the choice of completing the incomplete series, starting a new series, or returning to DOS. If the operator chooses to start a new series, the series and file numbers are incremented and the program 300 proceeds to step 2. (In this case, the index lines and data files for the incomplete series will remain in the file system.) If the operator chooses to complete the current series, the program 300 proceeds to a modified form of step 2 and then continues with the interrupted series, exactly where it was left off.

If the file named "INDEX" exists but does not contain any data (this can happen if the program 300 has, for example, been interrupted while trying to construct a new index file), the program 300 will crash. The cure for this is to erase the empty INDEX file.

6.4.2. Hardcopy prompt

Under all circumstances except when resuming an interrupted series, a program prompt asks whether hardcopy output is desired. The default is "Yes", so the choices presented are N and <CR>. Hardcopy must be generated for formal experimental series. If the choice is yes, then the program 300 immediately produces a five-line header at the printer. The text of the header reads "PORTREG HARD COPY".

If the printer is not connected or not on, the program 300 will exit to DOS at this point, with an error message. If no previous index was present, an empty index will be created, and must be removed before the program 300 is restarted.

If it is resuming an interrupted series, the program 300 issues the same hardcopy prompt; however, a "yes" reply will produce a continuation header rather than the standard header, and instead of proceeding to step 3 (section 6.4.3.) the program 300 immediately resumes normal operation, presenting the standard message for selecting the next run in an ongoing series (see Section 6.4.4).

6.4.3. Setting parameters

At this stage the computer allows the operator to establish the parameters for the series using the assigned F-keys. The experimental setup display comes up in the format of a set of boxes drawn on the screen. The largest, in the upper left quadrant, is labeled "Control Panel" and summarizes the current settings for the experimental parameters. Below the Control Panel is a box labeled "Index Line" that displays the current index line; much of the information here is redundant with the Control Panel, but it shows the index information exactly as it will be entered into the permanent INDEX file. Below the Index Line is a box labeled "Message" which displays information, comments, and prompts to the operator. Four other boxes toward the right of the screen, labeled "Mean", "Current", "Count", and "Tape", are used only when the program 300 is actively generating data in the Digital feedback mode.

The bottom of the screen shows the mnemonics associated with the F-keys, which are assigned meanings according to the following definitions.

- F1: GO—start the series with the parameters as currently set. These cannot be altered thereafter until the current series is completed. (Go to step 4, "Running the experiment").
- F2: QUIT—exit to DOS, without changing the index file or generating data. Exiting the program 300 by this route, if it has never run before in the current directory, will cause a size-0 INDEX file to be generated; this must be erased before PORTREG will run properly.
- F3: VOL/IN (Mode of instruction)—This F-key selects the mode of instruction by toggling through the following list. The mode constrains some of the choices available for other parameters; Table 1, on page 17, shows the allowed combinations.
    - V—Volitional: Operator chooses the intention for the next run; recorded as V/B, V/H, or V/L
- I—Instructed: Intention for the next run is randomly assigned; recorded as I/0
    - R—Remote: Intentions are chosen by remote operator and entered in index after series is completed; originally recorded as R/X
    - C—Calibration: No intention; recorded as C/X
    - E—Experimental: H and L intentions are randomly assigned, B runs are volitionally located.
    (Note: This mode is not used in current experiments.)
- F4: INTENT—Toggles the intention through the range of values allowed under the current mode (see Table 1). Possible values include B, L, H, X, 0. The meaning of the codes is:
    - B—Baseline intention
    - L—Low intention
    - H—High intention
    - X—Unknown intention for remote run
    - 0—Either a null intention for calibrations, or a machinedetermined intention for the instructed mode (I)

In the last case, 0 will automatically be replaced with H, L, or B when the random assignment is generated by the REG. The program 300 displays the intention to the operator and inserts the appropriate letter into the index line.

- F5: PROTCL—Toggles the protocol through the range of allowed values under the current mode. The range of protocol letters is A, B, C, D, V, and X, though not all of these are available under any given mode (see Table 1). The intended meaning of the protocol letter codes is:
    - A—standard operation, operator present at machine and getting feedback
    - B—operator present in adjacent room, no concurrent feedback
    - C—remote operation, experimenter runs machine
    - D—remote operation, off-time as well as distant
    - V—variance protocol, intentions to increase (W), or decrease (N) variance
    - X—exploratory protocol, predesignated series not included in database
- F6: A/M (Auto or Manual control)—Under automatic control (A), trials are generated at 0.75 second intervals until the run is complete. In manual control (M), the machine waits for an operator keypress for each trial.
- F7: DISPLAY—This governs the display (feedback) provided to the operator during the experiment:
    - D—(Digital) The default display, which simply preserves the basic control panel display already showing. The box labeled "Mean" displays a running mean of the data in the current run. (Specifically, for 200-sample trials, it is the theoretical mean of 100 plus 1/N times the current cumulative deviation in bits, where N is the number of trials per run.) The box labeled "Current" shows the current trial value; the "Count" box shows how many trials have been generated in the current run. The box labeled "Tape" maintains a scrolling display of the last 20 trials generated.
    - R—(REG panel) Mimics the LED displays on the front panel of the benchmark PEAR REG by presenting large red block digits in black boxes on a white background. It shows the running mean, current trial outcome, and number of trials completed.
    - G—(Graphic) Shows an evolving cumulative deviation trace with reference to upper and lower 5% significance envelopes appropriate in scale to the length of the run. Color coding is used to cue for direction of intent: the zero-line is in dark green, the upper envelope is in dark blue, the lower envelope is in dark red. The cumulative traces are similarly coded, but use bright colors. In addition, an icon in the upper left corner is used to remind the operator of the direction of intent: a green horizontal line for baseline, an up-pointing blue arrow for high, a red down arrow for low.
    - A—(Alternative Graphic) Reverses the color coding, with red indicating high and blue indicating low.
    - L—(Late Envelope) Does not draw the significance envelope until after the run is complete, and uses no color coding.
    - N—(None) No-feedback mode. This display is mandatory for B, C, and D protocols, and excluded otherwise in the current version of the software. While the run is in progress, the screen turns blue and a message saying "Non-Feedback Protocol" is displayed, together with a line giving the actual protocol (Calibration, B, C, or D) and a flashing line that says "Run In Progress". This display is maintained until the run concludes, and then the screen automatically returns to the basic control panel so that the run statistics can be displayed.

F8: NTRIAL—This is the number of trials per run. The F-key toggles the current value through the allowed values of 50, 100, 1000. The startup default is 50, while the B, C, and D protocols require 1000. (The unused E mode does not allow 1000.)

F9: SIZE—This is the sample size (bits per trial). The F-key toggles through the allowed values of 20, 200, 2000. The startup default is 200, and is the standard for formal experiments.

F10: INDEX—This allows the index line to be edited directly in situations where an exploratory protocol is employed or when index notation other than those produced by the F-keys is required. Text entered from the keyboard replaces index line text at the current location, indicated by a blinking green cursor in the line below. The F-keys are disabled; more precisely, the 6-character mnemonic associated with each F-key will be treated as text input from the keyboard. To skip forward without changing, use the spacebar; to move backward in the index line, use <BS >. When done modifying the index line, use <CR> to return to the F-key controlled display.

The requirements of the various protocols are such that certain combinations of secondary parameters are excluded. For example, remote series may not use 50 or 100 trials per run. The rows of Table I show the parameter combinations that can be used.

TABLE 1

Allowed Combinations of Parameters

| Mode | Intention | Protocol* | Auto/Man | Display | N-Trials |
|---|---|---|---|---|---|
| V | B,L,H | A,B,V,X | A,M | All but N | All |
| I | 0 | A,B,V,X | A,M | All but N | All |
| R | X | C,D | A | N | 1000 |
| C | 0 | B | A | N | 1000 |
| E | B,0 | A,V,X | A,M | All but N | 50,100 |

*Protocol B exceptions: Auto/Man = A, Display = N, N-Trials = 1000

6.4.4. Running the experiment

After parameters are set, and the index line recorded in the logbook, the operator may proceed by pressing the F1 key. The F-key display at the bottom of the screen is erased. If running a mode that requires replacement of "0" by a machine-generated intention, this is done now, following instructions given in the "Message" box. The index line is written to the INDEX file and printed out to hardcopy. A prompt appears in the "Message" box, indicating the intention and reading "Press any key to start data generation". If the control setting is Manual, another line alerts the operator that a key must be pressed for each trial. As soon as a key is pressed, the selected display mode appears on the screen. The appropriate amount of data are now generated either automatically or by the required number of manual keypresses. (If the F-REG 100 is not connected to the COM port, or is not turned on, the program 300 will wait, and begin normal operation when the box is switched on.) Once the run is concluded, the raw data are recorded in a file on the hard disk and on the printer. In the no-feedback display, the basic control panel immediately returns, showing the run statistics in the "Message" box for recording in the logbook.

In the R, G, A, and L displays, the special display is maintained until the operator presses a key indicating readiness to proceed; then the basic control panel returns to display the run statistics.

The statistics display is maintained until another keypress, after which the "Message" box displays a prompt indicating how many runs of each available category remain in the current series. (This is the point at which a continued series picks up after hardcopy output is determined.) The available categories depend on the instruction mode: for example, in a V series this prompt shows how many H, L, and B runs remain; in an I series, where all three intentions are randomly assigned, the prompt shows how many runs remain. However, the operator is always given the option to quit at this time without generating further data. The letter code for the next run must be followed by a <CR> so the operator may be sure of entering the correct letter rather than being "trapped" by an inadvertent keypress; no irreversible action takes place until <CR> is pressed. Invalid options simply cause the prompt to repeat. When a valid option is chosen, the program 300 returns to the beginning of Step 4, updating the file number and (if necessary) assigning an intention.

If the series is complete, instead of offering a prompt, the program 300 notifies the operator that the series has been completed and returns control to DOS.

6.5. Technical features

All output operations take place at the beginning and end of a run. The INDEX file is maintained open, in "Append" mode, throughout the execution of program 300. As soon as the operator returns a response indicating readiness to proceed, and has selected a run intention that is allowed by the current experimental mode, the index line is written to both the hardcopy and the INDEX file. This is a hedge against the fraudulent stratagem of halting the computer before data are recorded if the run is proceeding contrary to intent: such manipulation will be clearly evident in the permanent hardcopy, in the form of "orphan" index lines and interspersed headers. Also, the program 300 does not respond to "Break" commands from the keyboard. At the end of the run, the data are recorded in a disk file, and the raw data and summary statistics are printed on the hardcopy record.

7. Using PORTCAL

The PORTCAL program is essentially a clone of the PORTREG program, and uses much the same operator interface and record-keeping. It is intended to be used only in the "C" calibration mode, reached using the F3 key during the setup stage. In this mode, the program 300 is set to generate 1000-trial runs and automatically proceeds to the next run after the results of the current run have been displayed for about a minute. The accumulation of runs continues until interrupted using the Esc key, which causes graceful termination at the end of the current run. The INDEX file is updated with a new line for each run, with automatically incremented file numbers; the program 300 labels all calibrations in one session with a single series number, which is incremented when a new session is started. The program 300 can accumulate more than 100 runs within a given series; however the program 300 cannot be restarted if the INDEX file has more than 100 runs with the same series number. The file may be edited, or a new INDEX may be used.

The program 300 makes only one copy of the data, in the hard- or floppy drive directory from which the program 300 is invoked. Hardcopy is typically not made, although the option remains. To conserve disk space, the format for recording the data in calibrations is a single ASCII character representation, rather than the ASCII text format used by the PORTREG program. This precludes use of the PORTCAL program for 2000-sample data.

A variant of the program 300 called PCAL2 provides an option to specify a number of runs for the calibration session, all with the same series number. This allows the experimenter to generate calibration datasets of a size commensurate with experimental databases. PCAL2 defaults to a session length of 10 sets of 1000 trials, then increments the series number and proceeds until the Esc key is pressed. PCAL2 also bypasses the control panel options, automatically setting the calibration parameters.

8. Using ARROWREG 350

A customized version of the F-REG 100 software was designed for an experimental collaboration involving a special operator population. Differences include control of trial initiation and assignment of instruction by the experimenter, and a special arrow display for feedback. The program 300 never displays the control panel, since it uses only one set of parameters, namely: volitional choice of intention for 1000-trial blocks, local operator, automatic trial initiation, the arrow display, and 200-sample trials generated in 100-trial runs that are concatenated in single 1000-trial files.

The ARROWREG 350 program is operationally similar to PORTREG, but for feedback uses a simple graphic display that combines the instruction with ongoing feedback. On a blue background, a large yellow arrow pointing to the right or left designates the instruction, and moves in steps whose size and direction show the accumulating deviations of trials from the expected value. (An optional form of the feedback, where the arrow moves only once every 10 trials, and displays the mean deviation of the most recent 10 trials, is used whenever a file named "NOT.ACC" is present in the current directory. This file need only exist, i.e., needs no particular content; if it does not exist, the program 300 will default to the cumulative display.)

At the beginning of each run, the arrow point is at the expected mean, which is represented by a vertical white line in the center of the screen. A right-pointing arrow corresponds to the "high" intention, and will move in the indicated direction when the trial value (or the mean of 10 trials) is larger than 100; a left-pointing arrow corresponds to the "low" intention, and will move to the left for outcomes smaller than 100. Baseline instructions are represented by a "lozenge" icon of similar size, that is centered on the expected mean when the run starts.

The horizontal steps are on a logarithmic scale with large steps near the center but decreasing step size for larger cumulative deviations, to ensure that the feedback will not move completely off screen during runs with extreme deviations. Two versions of the arrow are available, depending on the content of a file called "ARSCALE.DAT" in the root directory of the disk from which ARROWREG 350 is invoked. The file must be a text file containing two lines with a single number on each line, giving respectively, the arrowhead length and the arrow tail (and baseline lozenge side) length. An ARSCALE.DAT file that looks like this:

30
70 will produce a long arrow that most observers like, while the numbers 25 and 25 will produce a shorter arrow that some observers have found more appealing because there is less weight on the "wrong" side of the intended goal. The software is shipped with ARSCALE.DAT containing the long arrow parameters.

The default random source is a F-REG 100 connected to COM1. Optional arguments may be used to direct the program 300 to use COM2 or to run a 100 trial demo. It is also possible to invoke an algorithmic random source; see Section 8.2., points 4 and 5, below.

The program 300 is designed for 100-trial runs within 1000-trial series, and allows graceful interruption and resumption of series. Because the 1000 trials are written to a single file, the single corresponding line in the INDEX file will have the date and time for the last 100-trial data set only. The experimenter should record more detailed timing information for the separate runs or sessions in the logbook. The program 300 provides for optional notes in the index line to document conditions for the 1000-trial datasets.

8.1. Setup (See Section 5 for a convenient sample setup designed for the PORTREG program, which uses a similar basic structure. In addition, ARROWREG 350 maintains a floppy backup as well as the hard copy. It has two possible feedback modes and if both are used, separated databases are required.)

A. Create a directory system that has a separate directory for each operator using his or her identification number (NNN) as the name. Create a floppy diskette for each operator (one floppy diskette may be used for several operators, provided each operator has his own NNN subdirectory on the diskette.)

B. Within NNN, create two subdirectories for the two styles of feedback only if both will be used; suggested names are ACCUM and NOTACC. Create these subdirectories within NNN on the hard disk also. These will be the "appropriate" subdirectories for recording the actual data. On the hard disk, a file named "NOT.ACC" must be created in each operator's NOTACC subdirectory to use the non-cumulative display, and this subdirectory must be the "current" directory from which the program 300 is run. This file need only exist, and need have no content; its presence in the current directory signals the program 300 to use the non-cumulative feedback. Note: If only the standard cumulative feedback is used, the data should be written in the NNN directory on both hard and floppy drives.

3. Install the files ARROWREG.EXE, DECOMP.EXE, MAKETEXT.EXE and STRIP.EXE somewhere in the execution path. Install ARSCALE.DAT in the root directory, C:\(specifically, the root directory of the drive from which the ARROWREG 350 program is invoked, which typically is the C: hard drive).

8.2. Preparing for a session

A. Connect the F-REG 100 to the serial port and attach a printer that can use continuous, fan-fold paper. (Neither is necessary if you are only going to do a demo.)

B. Make sure that a floppy diskette is present in the A: drive and that the A: drive is set to the appropriate subdirectory for the operator (NNN) and, if applicable, for the feedback type (ACCUM or NOTACC). A different floppy drive can be used, as described below in item 7.

C. Make sure that the hard disk is set to the appropriate corresponding subdirectory for data collection for the current operator and feedback type. This hard drive subdirectory must be the current directory from which the program 300 is invoked.

EXAMPLE: If your hard disk for the experiment is the C: drive and you want to set up operator 13, who has directories 013 on both the hard disk and a floppy diskette, to do a series with non-cumulative feedback, you could insert the diskette into the A: drive and then type as follows (DOS prompts are included in uppercase, to reproduce how things would look on the screen):

C:\>a:
A:\>cd 013\notacc
A:\013\NOTACC>c:
C:\>cd013\notacc
C:\013\NOTACC>arrowreg (this starts the program 300)
(To get the computer's prompt to tell you what directory you're in, give the command "prompt $P$G" either by hand or in the autoexec file.)

D. If the F-REG 100 is connected to port 1 (COM1), you may simply type "arrowreg" to start a session. If it is connected to port 2, you must specify this with an argument: type "arrowreg 2".

E. You may run a demo by typing "arrowreg –1". In the demo, the arrow moves regularly to the right and left in sequences of 12 non-random steps, to show what the feedback display is like. After a single 100-trial run, the program 300 returns to DOS. The demo mode does not require the printer.

F. If invoked with a positive argument larger than 2 (e.g., "arrowreg 3"), the program 300 will go to a debugging mode that uses an algorithmic pseudorandom source, producing runs with pseudo-randomly determined trial outcomes. The speed with which the trials are generated is determined by the computer speed, and is typically faster than with the F-REG 100 source in its default mode. On a standard 80286 processor with no math coprocessor, the 100-trial ran takes about 12 seconds, and on an 80486 machine, about one second. In contrast, using the F-REG 100, timing delays in the program 300 ensure that a run takes about one and a half minutes. The algorithmic pseudo mode is designed only for debugging, and is not intended or recommended for formal experiments. However, the program 300 has nearly complete functionality with this source and writes data files and index in the normal way to allow familiarization with the complete system. This mode does not require backup floppy or printer.

G. A second argument can be used to override the default selection of the A: drive for the floppy diskette (using the second argument means that the first must also be specified rather than defaulting.) The first character of the second argument is used as the drive label. For example, if you wish to read REG input from COM1 and write data to drive B:, the program 300 must be invoked by typing "arrowreg 1b". For convenience, this command line may be placed in a batch file. The software package includes an example in the file ARROW.BAT, which may be altered to suit local requirements. Given this batch file, typing "ARROW" at the DOS prompt will automatically invoke ARROWREG 350, reading from COM1, and write the backup to drive A:. An additional line containing "copy index a:/v" will copy the file named INDEX from the current directory to A: (with a verification check) after the program 300 terminates.

8.3. Running the session

If ARROWREG 350 does not find a file named "INDEX" on the hard disk in the current directory it assumes you are setting up a new operator; it creates a new index file, asks you the operator number, and assumes you are starting with file 1, series 1. If it does find a file named "INDEX" it reads the file to find the operator, file, and series number, and whether the most recent dataset is complete (has 1000 trials).

If the printer is not connected and switched on, the program 300 will crash, and must be restarted when the printer is available. The data will be printed after each block of 100 trials, with a session header that includes the current index line, indicating operator, series, file number, and date, and the number of completed trials in the current intention. The header is printed at the beginning of any new session, but not for each block of 100 trials. Printing is disabled in the demo mode and in the high-speed, pseudorandom debugging mode.

If there is a pending (incomplete) dataset, the program 300 will indicate the current intention and continue with the "press any key to begin" prompt.

If the latest dataset is complete, you will be told you are starting a new run, given the current operator, series, and file numbers, and asked for any optional notes to record in a 24-character field set aside in the index line for any encoding or identifying information the experimenter wishes to include in the index. You will then be asked for the intention, and after specifying it, the prompt to begin will appear.

The computer will now proceed with standard runs. At the start of each run it will show a static arrow feedback display that reminds the operator of the intention and waits for another keypress. When any key is pressed, the run will begin, and the program 300 will go to the moving-arrow display screen. Once the run is completed it will record the data, return to the text screen, and show the number of trials completed. If the number completed is less than 1000, you will be given an option to quit or continue. If you choose to continue you will return to the static arrow start-run prompt. If you choose to quit, or if 1000 trials have been completed in the current dataset, you will be returned to DOS. The program 300 will not allow a change of intention before completion of the 1000 trials.

It is important to note that each 1000-trial dataset is an independent experiment, with a completed datafile and index line. Therefore, maintaining the tripolar protocol of matched R, B, L data is the responsibility of the experimenter. This flexibility is intended to allow the use of predetermined, balanced orders of presentation of the three intentions.

8.4. Warnings and Utilities

The current version of the program 300 automatically backs up the data files to floppy diskette, but not the index file. We recommend copying the index file (e.g. "copy index a:\NNN") to the diskette after each session. As described above, this can be automated using a batch file.

Since the index information written by ARROWREG 350 differs from the standard form, the index parameter search in NEWSTAT is limited to file, operator, and series numbers. A search specifying intention is also possible, but the intention letter (R, L, or B) must be entered in the mode location, i. e., under M in the prototype line; this is the first location after series number. The "C" in the "Search" line is in the location that must be used for the intention or instruction letter.

If for some reason you need to use a text editor on the index, for example to add notes, you should run the program 300 STRIP.EXE on the index file before running ARROWREG 350 again. (If you have installed STRIP on your execution path, simply type "strip index" in the appropriate directory.) DECOMP To conserve disk space, ARROWREG 350 writes data files in a compressed format that cannot be read by conventional statistics packages. NEWSTAT can read this format, but for other purposes the DECOMP program may used to convert data files written by ARROWREG 350 to normal ASCII text files. Typing "decomp datafile", will display the contents of "datafile" on the screen. To create a new file with the ASCII version of the data, follow this example: "decomp 00072.dat>72.asc". This will convert data file number 72 to a text file named 72.asc.

MAKETEXT

To convert all datafiles in a subdirectory to ASCII text files, the MAKETEXT utility applies the decomp process to all files with the ".DAT" extension. Type "MAKETEXT" in the subdirectory, first ensuring that there is sufficient disk space for the six-fold expansion. The utility makes new files with the same prefix or file number, but a ".TXT" extension, leaving the original files unchanged.

READFILE

The NEWSTAT program can be used to accumulate and concatenate data of a specified intention or other indexed category, and to write this dataset to a named DOS file. The data format for this file is integer rather than ASCII, and to convert it, the READFILE utility may be used. Type "readfile oldfile>newfile" to produce the expanded ASCII text version of the data.

9. Using NEWSTAT

The statistical analysis program, NEWSTAT, is menu based and is largely self-explanatory. Proficiency in its use demands some practice, since there are many capabilities, accessed via function keys and a multi-layered menu. It is designed for the REG experiments, although it is possible to read in other data, given an appropriate format. The program 300 provides for identification and concatenation of three separate datasets, maintaining each in a buffer (called a stream) that can be analyzed separately. For the graphic display of cumulative deviations, all three streams are used, if present. NEWSTAT does not generate comparisons between streams (other than the cumulative graph) but provides the necessary statistics for such comparisons. For example, given equal N's, a Z-score for the difference between two conditions may be computed as the difference of the individual Z's, divided by SQRT 2.

The program 300 is invoked by typing NEWSTAT, in lower or uppercase, and a carriage return or enter (<CR>). Introductory notes are first displayed, and further <CR>'s show requests for parameter selection to set the proportion of memory available for data, and the number of samples. For a dataset larger than 168,000 trials, one could increase the proportion for data; for an unusually large index, it might be necessary to decrease the proportion for data, but in most cases the default settings will be adequate. The default settings are selected by <CR>, after which the program 300 goes to the main menu. F-keys control options, detailed below, to select one of the three streams, read data to a stream, change drive/directory, clear a stream, show stream content, show current index, list available data files, do statistics on a stream, display cumulative deviation graphs or bin population graphs, or write a file to DOS. (This DOS file is a memory image, readable only with custom software.) This screen includes the main menu and a "program status" box that is used to report the content (in number of trials) of the three data streams, and the remaining available memory. The options may be selected using the F-keys or by using cursor movement keys to highlight the desired function, then the carriage return or enter key. Most of the items in the main menu are guided by instructions in the message box.

F1 Using F1 to "Select stream" produces an instruction to use F1, F2, or F3 to specify the stream. Typing one of these is followed by an opportunity to supply an optional name that will be used in labels. A carriage return then selects the stream, making it the current stream, which is indicated by highlighting. (Alternatively, keys 1, 2, and 3 of the numeric keypad, not in numeric mode, can be used to specify the stream.)

F2 When a stream is selected (highlighted), the F2 key invokes a submenu for reading data to that stream. This screen also includes the program 300 status box. It has five options, the first of which, F1 "Choose Read Stream", returns to the "Choose a Stream" function and labeling option; <CR> returns to the Reading menu. The F2 key, "Input File Name", within the Reading menu requests an individual file name, typically of the form #####.DAT; <CR> reads the data to the selected stream and returns to the Reading menu. F3 now allows a "list of #####.DAT" files to be given, where only the actual numbers, with no leading zeros or file extensions, can be typed, separated by spaces, in the box headed "Enter File Numbers Below". <CR> goes to a new line in the box, where more numbers may be typed; two consecutive <CR>'s will read the data to the stream. After reading, the cursor is in the message box, but control is in the Reading menu.

The most often used Reading option is F4, the "Index Param Search". The screen display shows the "Format" for and a "Sample" of a parameter search entry. In the "Search" line, use the space bar to move to the position (s) you wish to specify, and type the letter(s) or number(s) identifying the data subset you wish to read into the current stream. (The index for the ARROW-REG 350 program differs, as described in Section 8.4.) Backspace may be used to correct errors. <CR> accepts the search parameters and reads the data, returning to the Reading menu. One or several parameters may be used; where no parameter is specified, all data in the current index will be accepted. Before reading, the file numbers are listed, with a query that must be answered with "y" to proceed. Answering "n" will cause no data to be read, and a return to the Reading menu.

With any Reading option new data may be added to the current stream, or you may select a different stream for reading the next data set. If too many data files (using default settings, more than 168,000 trials) are available, the message box will report "Stream cannot grow", and the program 300 may hang. Control can usually be restored using <CR>, but the index file should be edited or other measures taken to limit the accessible data.

If any score outside the range 65 to 135 is read, notification will be presented in the message box. The "outlier" will be included in bin 65 or 135 and all calculations will use this value.

Having read data to one or more streams, F5 returns to the main menu where several options for displaying or processing the data are available.

F3 This main menu item allows you to change the directory that NEWSTAT accesses, and reports "INDEX found and loaded" if you give an appropriate specification using standard DOS notation. This option allows you to access data files from different subdirectories, making it possible to combine these into a single data file for analysis. If the directory doesn't exist, it reports "Could not be found—no change". If you change to a directory without an INDEX file, it warns that no index exists, but does make the change.

F4 This allows you to clear a stream, giving the message "Current stream is #. Clear (Y/<CR>)?" and requires you to type "y" in order to clear the stream.

F5 The F5 option shows the stream contents, as a display of the trial counts with a label indicating the range (e.g., 1 to 136 of 1000) in the stream contents window. The cursor key pad allows movement through the contents using a standard display scrolling routine, which exits to the main menu with <CR> or <ESC>. Control remains in the main menu if there are too few items to require scrolling.

F6 This shows the current index with a range label; pg-up and pg-down allow movement. The display scrolling routine is used as in F5.

F7 This shows the #####.DAT files or SERIES.### files in the current directory, with range indicated. The display scrolling routine is used as in F5.

F8 The F8 menu option produces a display of the descriptive statistics for the current dataset (stream). The resulting screen shows the number of trials indicated in the status box. At top left is the "Mean<Th|Exp>", that is, the theoretical mean and the experimental (empirical) mean. At top right are the theoretical and empirical standard deviations. In the next line is the Z-score for the dataset, with its associated p-value, and the T-score with associated p-value. Both the Z and the T represent the deviation of the mean from its expectation, the Z in units of the theoretical standard deviation, and the T in units of the empirical standard deviation. These are similar when the number of samples is large and the REG distribution variance is nominal, but the Z is usually preferable since it is not distorted by chance fluctuations (or noise) in the variance estimate.

The third and fourth lines represent the higher moments of the distribution: variance (F-ratio), skew, and kurtosis coefficients, and their associated p-values. These are presented for completeness in characterizing the distribution, but are of value primarily for ensuring that the REG is performing nominally. They will show occasional significant deviations due to chance fluctuations, but any persistent tendency to very high or low values may indicate equipment problems.

The next line shows the smallest trial score (Minval), the number of trials lower than the expected mean, the number exactly at the mean, and the number higher than the mean, and finally, the largest score (Maxval). The last line shows the computed ChiSquare for goodness-of-fit of the empirical bin population distribution to the theoretical expectation for bin populations, and the associated degrees of freedom and p-value for the Chisquare. (Bin populations are counts or frequencies of individual trial scores.) Also in this line is the p-value for the Kolmogorov Smirnov test (Smirnov P), which assesses the greatest deviation of the cumulative distribution of bin populations from the corresponding theoretical distribution.

For the statistics display, control remains at the main menu; arrow keys move up and down in the menu, and <CR> invokes the highlighted item, or an F-key can be typed to invoke the desired menu item.

F9 The F9 menu option produces a graph of the cumulative deviation of the data stream(s). First the message box asks "Do you want to label the graph (Y/CR)?" An explicit "y" allows you to type a label identifying the data currently present in the buffers, that will appear at the top of the graph. <CR> displays the graph on screen, showing the cumulative deviation of each data stream relative to the expected mean, together with an envelope of the one-tailed p=0.05 confidence levels for any cumulated database size. The computer display uses three colors to distinguish the three data streams, which will be labeled with the stream number or the optional names given during the "Select stream" stage. (Only the first three characters are used.) A hard copy of the graph may be printed using Shift-P, assuming the attached printer is, or emulates, an Epson printer or IBM Proprinter.

F10 This main menu item goes to a submenu for graphic displays of the data in a bin or count population form. The frequency of occurrence for each possible trial value is shown in various forms chosen by menu items. The submenu appears when F10 is invoked, together with the status report; the main box contains the bin populations of the current data stream. This screen gives the exact populations of 71 bins, or trial counts, from 65 to 135. If a value outside this range occurs, it will be added to the count in bin 65 or 135. Within the "Bin" menu, item F1 provides a graph of the full population compared with theoretical expectation; a solid line shows the expected binomial distribution. F2 now shows the same data as differences of the empirical populations from theory, with upper and lower 2.5% confidence envelopes. F3 converts these differences to bin-wise Z-scores, that is, a standard scale, and shows the confidence limits as straight horizontal lines at Z=±1.96. F4 is a variant of the F2 display, with each bin population displayed as a 95% confidence bar (2.5% limits for high and low frequencies).

F11 Shift-F1 (F11) provides an option to write the contents of the selected stream to a DOS file as an integer memory image (not ASCII text). The message box requests a name for the file, and reports a successful write. The function will not use a filename already in use in the subdirectory. Custom software can be used to read this file or convert it to ASCII. A PEAR utility named "READFILE" is available for this purpose.

F12 Shift-F2 (F12) quits the program 300, clearing all streams, but leaving all original datafiles and indices unchanged.

The statistics table or any of the text screens can be printed using the DOS Print Screen key, and the graphics displays can be printed on IBM or Epson compatible printers using shift-P. For Epson LX compatibles a second graphic print mode is available that prints a compact version of the graph using shift-X.

Error messages to identify any exceptions, limit overflows, or search failures will be printed in the "Messages" box. For the most part, these will be self-explanatory, or will help identify the problem. Usually you will be able to use <CR> to return to a prior level in the program 300 and then proceed. If you find it necessary to reboot, the original files will be intact, since NEWSTAT makes no changes in either data or index files.

It is understood that the above description is intended to be illustrative, and not restrictive. Many other embodiments will be apparent to those of skill in the art upon reviewing the above description, for example, the use of a complex or infinite series of numbers in place of noise source 102 for an F-REG used in certain environments. The scope of the invention should, therefore, be determined with reference to the appended claims, along with the full scope of equivalents to which such claims are entitled.

What is claimed is:

1. A random event generator device (100) comprising:
a noise-signal source (110) that provides a noise signal;

a sampler (116) coupled to the noise-signal source (110), wherein the sampler (116) outputs a series of digital data values (117) depending on a value determined from the noise signal;

a selective invertor (118) coupled to the sampler (116) that inverts some, but not all, of the series of digital data values (117) to produce a selectively inverted series of digital data values (119); and a driver coupled to the selective invertor (118) and operable to provide a signal having values representative of the selectively inverted series of digital data values (119).

2. The random event generator device according to claim 1, wherein the selective invertor (118) inverts some, but not all, of the series of digital data values (117) according to a pseudo-random sequence mask.

3. The random event generator device according to claim 1, wherein the selective invertor (118) inverts substantially every other one of the series of digital data values (117).

4. The random event generator device according to claim 1, further comprising:

a toy shell (601);

an actuator element (610, 620);

a motor (602, 604) coupled to the toy shell (601) and to the actuator element (610,620);

a variance accumulator coupled to the selective invertor (118) that accumulates a predetermined number of the selectively inverted series of digital data values (119) into a sample result; and a motor controller (630), operatively coupled to the motor and to the random-event generator, that controls the motor to move the actuator element based on the series of values generated by random-event generator driver or on the sample result, or on both.

5. The random event generator device according to claim 4, wherein the motor controller controls the motor to move the actuator element based on the selectively inverted series of digital data values (119).

6. The random event generator device according to claim 4, wherein the selective invertor (118) inverts some of the series of digital data values (117) according to a pseudo-random sequence mask.

7. The random event generator device according to claim 4, wherein the selective invertor (118) inverts substantially every other one of the series of digital data values (117).

8. The random event generator device according to claim 4, further comprising:

wherein the motor controller controls the motor to move the actuator element based on the sample result.

9. The random event generator device according to claim 4, wherein the variance accumulator subtracts an expected mean value from the sample result.

10. The random event generator device according to claim 1, further comprising:

a source of sequences of numbers, the source providing a sequence of numbers based on the selectively inverted series of digital data values;

a variance accumulator coupled to the source that accumulates a predetermined number of the sequence of numbers into a sample result; and a detector which detects whether a probability of the sample result exceeds a specified chance probability.

11. The random event generator device according to claim 10, further comprising:

a computer program programmed to teach a concept of probability or statistics based on the sample result.

12. The random event generator device according to claim 1, wherein the noise signal is based on a stochastic process; and further comprising:

a variance accumulator coupled to the value source, the variance accumulator providing a sample-result value having a deviation representative of a deviation related to the sequence of values.

13. The random event generator device according to claim 12, wherein the noise signal is a sequence of random digital data values (117 or 119).

14. The random event generator device according to claim 13, wherein the selective invertor (118) inverts some of the sequence of values (717) according to a pseudo-random sequence mask.

15. The random event generator device according to claim 13, wherein the selective invertor (118) inverts substantially every other one of the sequence of values (717).

16. A random event generator device comprising:

a noise-signal source (110) that provides a noise signal;

a sampler (116) coupled to the noise-signal source (110), wherein the sampler (116) outputs a series of digital data values (117) depending on a value determined from the noise signal:

a selective invertor (118) coupled to the sampler (116) that inverts some, but not all, of the series of digital data values (117) to produce a selectively inverted series of digital data values (119);

a driver coupled to the selective invertor (118) and operable to provide a signal having values representative of the selectively inverted series of digital data values (119)

a variance accumulator coupled to the driver that accumulates a predetermined number of the selectively inverted series of digital data values (119) into a sample result; and storage coupled to the variance accumulator that stores the sample result.

17. The random event generator device according to claim 16, wherein the variance accumulator subtracts an expected mean value from the sample result.

18. A random event generator device comprising:

a noise-signal source (110), that provides a noise signal;

a sampler (116) coupled to the noise-signal source (110) wherein the sampler (116) outputs a series of digital data values (117) depending on a value determined from the noise signal:

a selective invertor (118) coupled to the sampler (116) that inverts some, but not all, of the series of digital data values (117) to produce a selectively inverted series of digital data values (119);

a driver coupled to the selective invertor (118) and operable to provide a signal having values representative of the selectively inverted series of digital data values (119)

a microprocessor, the microprocessor providing a pseudo-random sequence mask to the selective invertor (118) in order to remove a first-order bias from the series of digital data values (117).

19. The random event generator device according to claim 18, wherein the microprocessor is programmed to provide a variance accumulator coupled to the driver that accumulates a predetermined number of the selectively inverted series of digital data values (119) into a sample result, and to store the sample result.

20. The random event generator device according to claim 19, wherein the variance accumulator subtracts a predetermined value from the sample result.

21. The random event generator device according to claim 19, wherein the microprocessor controls a control signal based on a magnitude of a deviation of the sample result from an expected mean.

22. The random event generator device according to claim 21, further comprising:

a video display; and a computer game program that controls an image on the video display based on the control signal.

23. The random event generator device according to claim 19, wherein power required to operate the random event generator device is extracted from one or more signals provided from an attached computer.

24. The random event generator device according to claim 1, further comprising:

a video display; and a computer program, operatively coupled to the video display and to the driver, that controls a display of video-game information on the video display based on the series of values generated by the driver.

25. The random event generator device according to claim 24, further comprising:

a selective invertor (118) coupled to the random-event generator that inverts some of the series of digital data values (117) to produce an selectively inverted series of digital data values (119); and wherein the computer program controls the display of video-game information on the video display based on the selectively inverted series of digital data values (119).

26. The random event generator device according to claim 25, wherein the selective invertor (118) inverts some of the series of digital data values (117) according to a pseudo-random sequence mask.

27. The random event generator device according to claim 25, wherein the selective invertor (118) inverts substantially every other one of the series of digital data values (117).

28. The random event generator device according to claim 25, further comprising:

a variance accumulator coupled to the selective invertor (118) that accumulates a predetermined number of the selectively inverted series of digital data values (119) into a sample result; and wherein the computer program controls the display of video-game information on the video display based on the sample result.

29. The random event generator device according to claim 25, wherein the variance accumulator subtracts an expected mean value from the sample result.

30. The random event generator device according to claim 25, further comprising a microprocessor, the microprocessor providing a pseudo-random sequence mask to the selective invertor (118) in order to remove a first-order bias from the series of digital data values (117).

31. The random event generator device according to claim 30, wherein the microprocessor is programmed to provide a variance accumulator coupled to the driver that accumulates a predetermined number of the selectively inverted series of digital data values (119) into a sample result, and to perform a statistical analysis.

32. A method for controlling a result based on a chance expectation of a statistic of a series of digital data values that include a random component (117 or 119), the method comprising the steps of:

providing a source (110) of the series of digital data values that include a random component (117);

selectively inverting some, but not all, of the series of digital data values (117) to produce an selectively inverted series of digital data values (1 17); and accumulating a predetermined number of the selectively inverted series of digital data values (117) into a sample result value; and controlling the result based on the sample result value.

33. The method according to claim 32, wherein the result controlled comprises a temperature of a gaseous, liquid or solid material.

34. The method according to claim 32, wherein the result controlled comprises an air movement.

35. The method according to claim 32, further comprising the step of:

providing light having a color and intensity;
wherein the result controlled comprises a light intensity or color.

36. The method according to claim 32, wherein the result controlled comprises an audio sound content or intensity.

37. The method according to claim 32, wherein the result controlled comprises an image on a computer display.

38. The method according to claim 32, wherein the result controlled comprises a computer-controlled indication of an emotional or volitional state of one or more persons.

39. The method according to claim 38, wherein the result controlled comprises a computer-controlled indication of an emotional or volitional state of one or more persons and purports to provide a sample of public opinion.

40. The method according to claim 32, wherein the result controlled comprises a computer-controlled indication of a conscious or physiological state of one or more persons.

41. The method according to claim 32, wherein the result controlled comprises a control of a channel selection on a television.

42. The method according to claim 32, wherein the result controlled comprises volume control of an audio output on a television, compact disk player, radio, or stereo.

43. The method according to claim 32, wherein the result controlled comprises a content or a brightness of a computer-generated image.

* * * * *

UNITED STATES PATENT AND TRADEMARK OFFICE
CERTIFICATE OF CORRECTION

PATENT NO. : 5,830,064

DATED: Nov. 3, 1998

INVENTOR(S) : Bradish et al.

It is certified that error appears in the above-identified patent and that said Letters Patent is hereby corrected as shown below:

In column 37, line 49, delete "further comprising:", therefore.
In column 40, line 17, delete "(1 17)", insert --(117)-- therefore.
In column 9, line 62, delete "Gameboyʊ", insert -- Gameboy™--, therefore.
In column 23, line 52, delete "1/0", insert --"I/0"--, therefore.

Signed and Sealed this

Fourth Day of July, 2000

Attest:

Q. TODD DICKINSON

*Attesting Officer*     *Director of Patents and Trademarks*